United States Patent [19]

Wiatt et al.

[11] Patent Number: 4,963,086
[45] Date of Patent: Oct. 16, 1990

[54] REHEAT BLOW MOLDING MACHINE FOR FORMING ARTICLES FROM PREFORMS

[75] Inventors: James G. Wiatt, Cincinnati, Ohio; Kevin J. Swiderski, Lowell, Mich.; Samuel L. Belcher; Roger D. Smith, both of Cincinnati, Ohio

[73] Assignee: B & G Machinery, Grand Rapids, Mich.

[21] Appl. No.: 352,846

[22] Filed: May 15, 1989

[51] Int. Cl.$^5$ ............................................. B29C 49/64
[52] U.S. Cl. ............................. 425/526; 198/465.3; 198/803.2; 264/535; 264/537; 425/529; 425/534; 425/538; 425/539
[58] Field of Search ............... 198/465.1, 465.3, 803.2; 264/535, 537; 425/522, 526, 529, 534, 537, 538, 539; 432/224, 225

[56] References Cited

U.S. PATENT DOCUMENTS

| | | | |
|---|---|---|---|
| 3,958,685 | 5/1976 | McDonald et al. | 198/179 |
| 4,059,188 | 11/1977 | McDonald | 198/477 |
| 4,082,175 | 4/1978 | Gibbemeyer | 198/377 |
| 4,086,999 | 5/1978 | McDonald | 198/377 |
| 4,140,211 | 2/1979 | Gibbemeyer | 193/40 |
| 4,140,464 | 2/1979 | Spurr et al. | 425/534 |
| 4,140,468 | 2/1979 | Duga | 425/534 |
| 4,185,812 | 1/1980 | Hall | 198/345 |
| 4,310,282 | 1/1982 | Spurr et al. | 425/533 |
| 4,313,720 | 2/1982 | Spurr | 425/526 |
| 4,382,760 | 5/1983 | Wiatt et al. | 425/526 |
| 4,457,688 | 7/1984 | Calvert et al. | 425/529 |
| 4,487,568 | 12/1984 | Wiatt et al. | 425/534 |
| 4,490,327 | 12/1984 | Calvert et al. | 264/533 |
| 4,498,854 | 2/1985 | Ross | 425/522 |
| 4,498,859 | 2/1985 | Gibbemeyer | 425/534 |
| 4,506,144 | 3/1985 | Hesford et al. | 425/174.4 |
| 4,684,012 | 8/1987 | Feddersen | 198/803.01 |
| 4,709,803 | 12/1987 | Swiderski | 425/534 |
| 4,784,253 | 11/1988 | Gibbemeyer | 198/424 |

OTHER PUBLICATIONS

Catalog material entitled, "RHB V Lightweight Simplisitic Pallet Breakdown", 4/84.
Drawing marked, "Sidel-SBO-24".
Photocopy marked, "Van Dorn Collet for PET Bottles".
Catalog entitled, "Van Dorn CIB-24 Blow Molding Machine".

*Primary Examiner*—Jay H. Woo
*Assistant Examiner*—Timothy W. Heitbrink
*Attorney, Agent, or Firm*—Price, Heneveld, Cooper, DeWitt & Litton

[57] ABSTRACT

A reheat blow mold machine includes a preform loader, an oven, a mold station and a preform transfer mechanism for transporting preforms from the oven to the mold station. A loader defines a plurality of lanes within which the preforms are supported. A reciprocal jaw assembly moves the preforms from a receiving end to a load end of the oven. The oven includes a plurality of tandemly arranged abutting pallets which rotatably support the preforms. The pallets are stepped through the oven and moved between a receiving end and a discharge end by a pair of elevators and a return conveyor. The transfer mechanism includes two sets of jaw assemblies, a pair of slidable actuators and a compensation mechanism to automatically adjust for tolerance variations in the diameter of the preforms. A mold station includes a pair of opposed platens which support mold halves. A bottom platen is positioned by a cam arrangement mounted on the opposed platens.

24 Claims, 16 Drawing Sheets

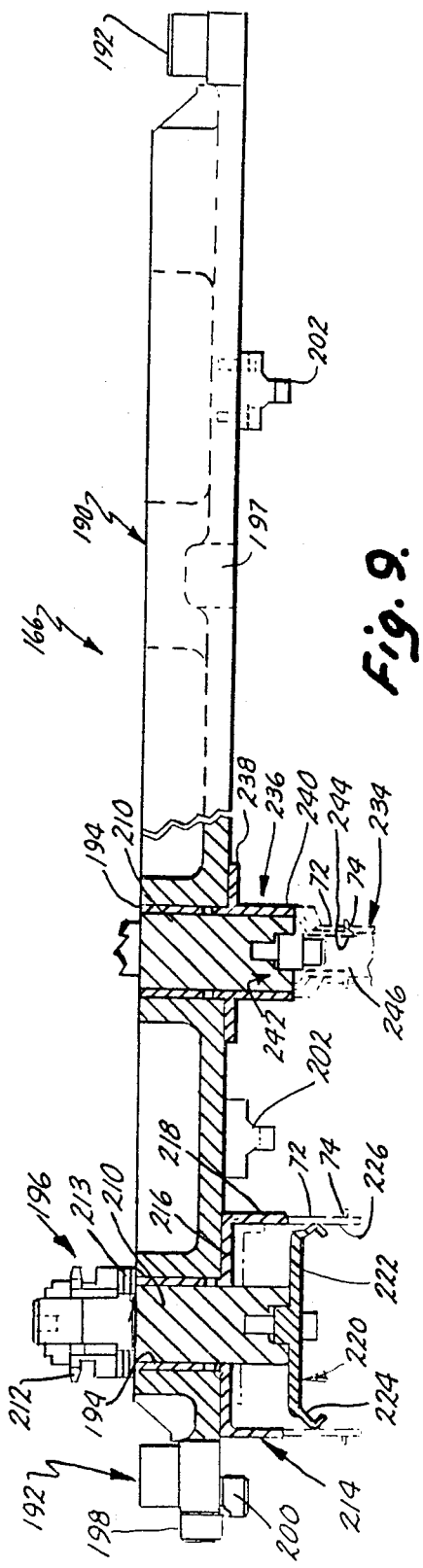
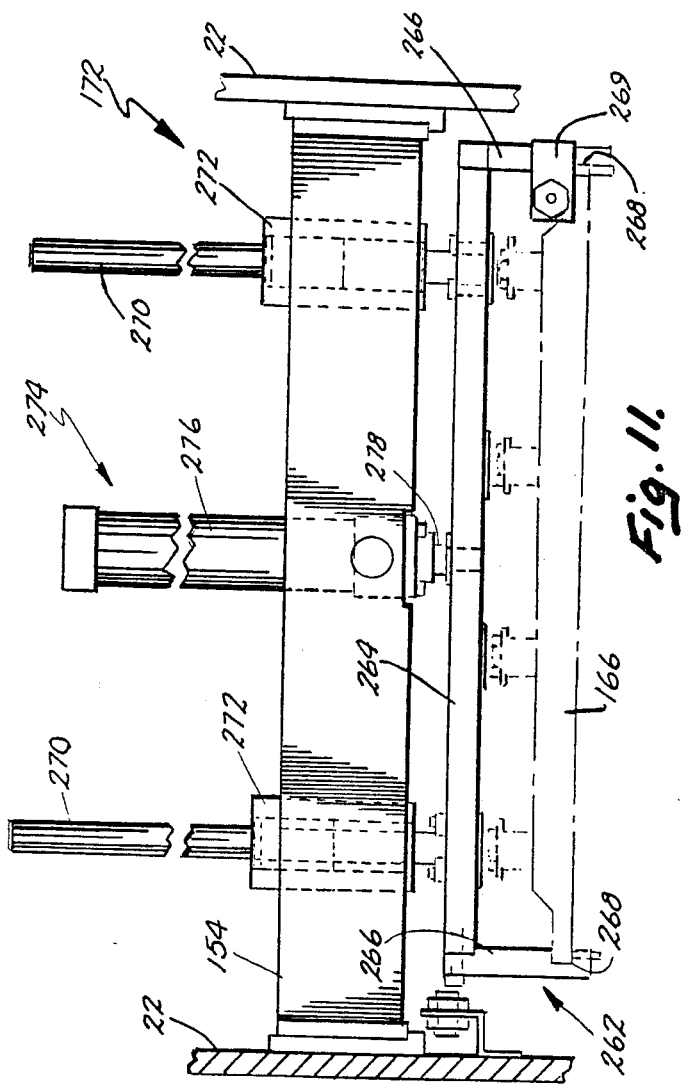

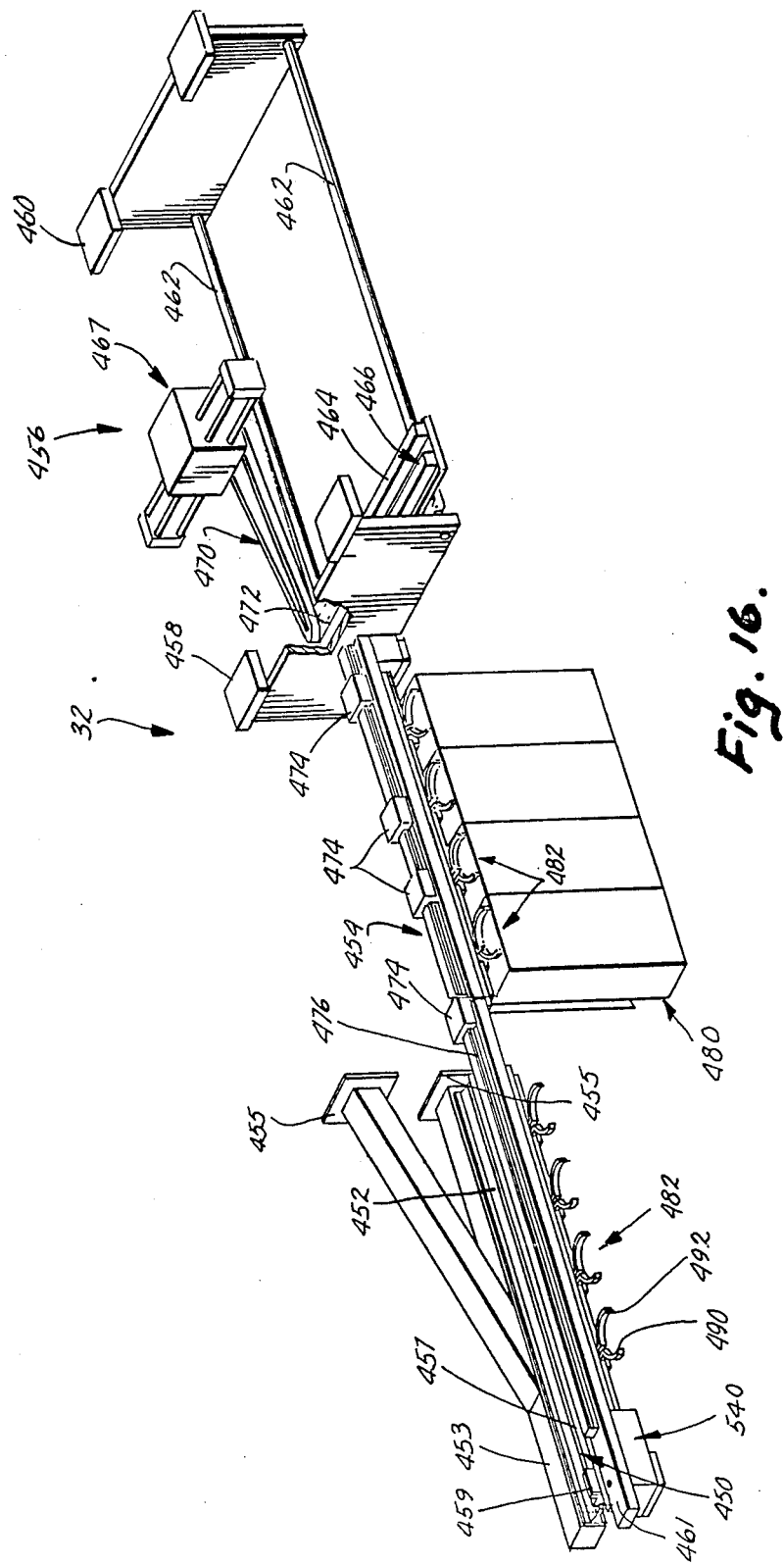

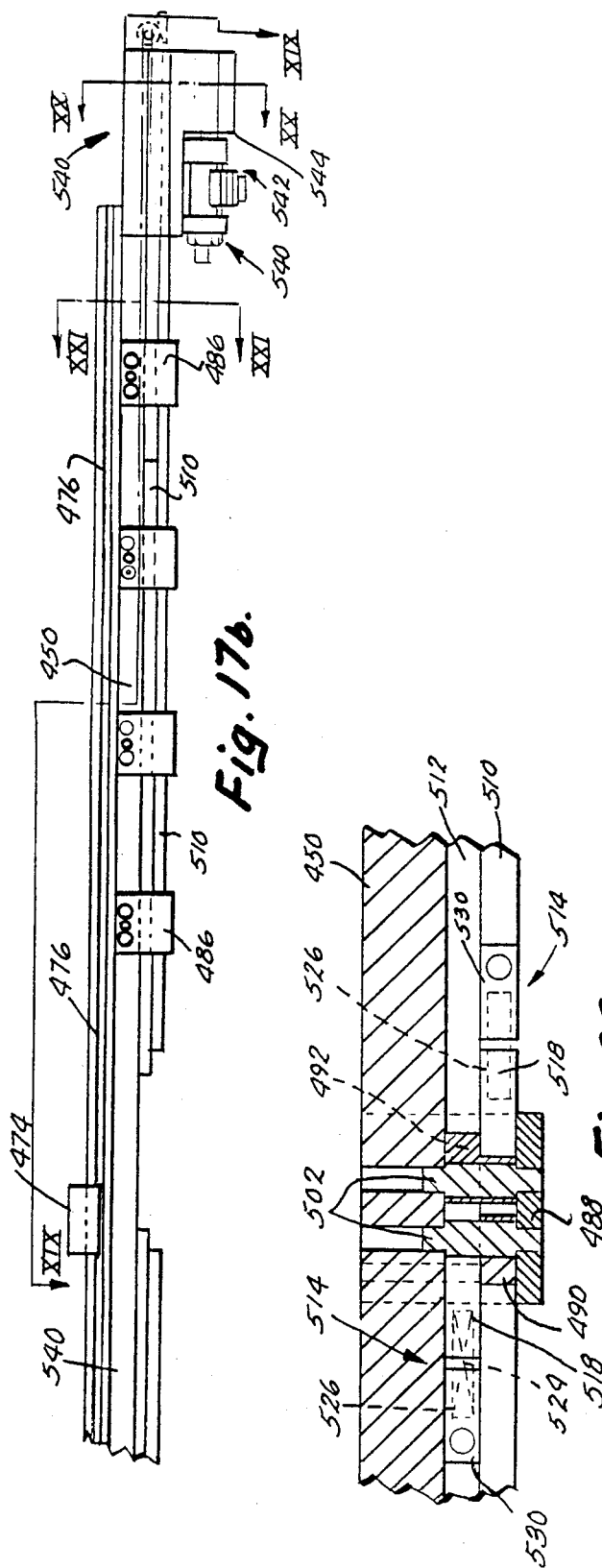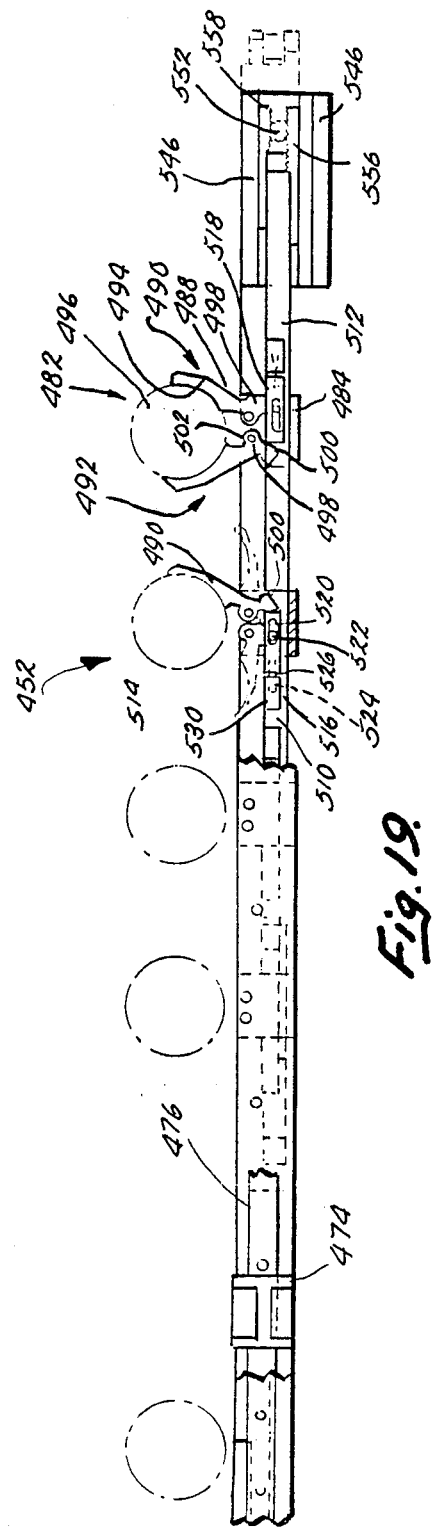

REHEAT BLOW MOLDING MACHINE FOR FORMING ARTICLES FROM PREFORMS

BACKGROUND OF THE INVENTION

The present invention relates to blow molding apparatus and more particularly to a reheat blow molding machine including an improved preform loader, oven transport assembly, preform transfer assembly and mold substation.

A wide variety of containers including those for carbonated beverages and food products, are manufactured using blow molding processes. Various plastics may be used including resins which are biaxially orientable. Such resins include polyethylene terephthalate (PET) and polypropylene (PP). In reheat blow molding processes, the plastic is first injection molded to form a preform or parison. The preforms have a test tube configuration, an external cap thread at an upper open end thereof, sometimes a pilfer proof ring and/or a support ring. The premanufactured preforms are reheated in an oven, prior to the blow molding operation. The oven receives the preforms and heats them to a desired temperature at which the plastic will biaxially orient and/or stretch in the blow molding operation.

In existing machines, the heated preforms are transferred from the oven to a blow molding station by a carriage or reach and take subassembly. The blow molding station includes a vertically split mold which may define a plurality of cavities. The preforms are properly positioned and the mold is closed. A blow head delivers high pressure air to the preforms to form them into the container configuration. The blow head may incorporate center rods which stretch the preform during the blow molding step. After the molding is completed, the mold is opened and formed containers are ejected from the machine. U.S. Pat. No. 4,784,253 entitled BLOW MOLDING APPARATUS and issued on Nov. 15, 1988 to Gibbemeyer and U.S. Pat. No. 4,310,282 entitled DELAY STRETCH AND BLOW MACHINE SYSTEM and issued on Jan. 12, 1982 to Spurr et al disclose examples of prior machines.

Typically, the preforms are delivered to an oven by a descrambler and orientation apparatus. The preforms are usually handled by the threaded neck and the lower portion of the preform is reheated as it passes through an oven structure. Continuous or endless chains including a collet arrangement may be used to rotate the preforms as they pass through the oven. In other arrangements, individual pallets or shuttles are used. The pallets arranged in tandem, abutting relationship, are moved through the oven in a stepwise fashion.

A blow molding apparatus employing a continuous conveyor and a plurality of couplings for transporting preforms through an oven is disclosed in U.S. Pat. No. 3,958,685 entitled COUPLING FOR HANDLING WORK PIECE, CONVEYOR COMBINED THEREWITH, AND METHOD which issued on May 25, 1978 to McDonald et al. In such apparatus, a coupling or collet receives a preform. The coupling is mounted on a continuous chain conveyor. Provision is made for rotating the preform as the coupling passes through the oven in order to insure uniform heating prior to the blow molding step.

An example of a pallet or shuttle assembly for a blow molding machine may be found in U.S. Pat. No. 4,684,012 entitled BLOW MOLDING PALLET ASSEMBLY and issued on Aug. 4, 1987 to Feddersen. The pallet is used to transfer preheated preforms from an oven through a blow mold and then to a discharge location.

Many different types of preform transfer mechanisms have been developed. One such mechanism is disclosed in commonly owned U.S. Pat. No. 4,709,803 entitled PREFORM TRANSFER MECHANISM and issued on Dec. 1, 1987 to Swiderski. The preform transfer mechanism disclosed therein includes a slide block or carriage which is reciprocated towards and away from a blow mold station. The carriage supports a plurality of jaw assemblies. Preform receiving and locating means are provided to receive the preforms from an oven and position them properly for engagement by jaws of the transfer mechanism. Provision is made for compensating for differences in preform size, within limited tolerances.

Problems heretofore experienced with existing machines include mechanical complexity, inherent limitations on production rates and limited versatility as to the size of the product produced. Available machines set up to make beverage bottles are not readily converted to manufacture containers having wide mouths. Typical beverage containers have a mouth with a diameter of 28 millimeters. Wide mouth containers usable for many food products have diameters up to 89 millimeters. Larger containers may also have a capacity of up to 1 gallon or 4 liters. A need exists for a machine of reduced complexity which will have increased or improved production capabilities and which is readily changeable to different size containers.

SUMMARY OF THE INVENTION

In accordance with the present invention, a universal reheat blow molding machine including a unique preform loader, oven, preform transfer mechanism and mold station are provided. The machine permits ready changeover to accommodate a wide variety of product sizes. Essentially, the loader assembly includes a base and a preform receiving means which is readily adapted to different size neck finishes. A jaw assembly is reciprocal on the base to transfer preforms from the receiving means to a loading position at the infeed end of an oven.

The unique oven in accordance with the present invention includes a transport assembly having a frame which slidably supports a plurality of pallets positioned in abutting, tandem relationship. Each pallet includes a collet or coupling which supports a preform. Provision is made for uniformly rotating each of the collets as the pallets are stepped through the oven. At a discharge end of the oven, provision is made for transferring the preforms from each pallet to a preform transfer mechanism and for returning the pallet to the infeed or loading end of the oven.

The preform transfer mechanism receives a plurality of preforms at the discharge end of the oven, transfers the preforms to a blow mold station and ejects formed containers from the mold station. The transfer mechanism is readily adaptable to different size neck finishes. The mechanism automatically compensates for tolerance variations in the diameter of the preforms.

In accordance with the present invention, the mold station is adaptable to two or three part molds. A platen and cam arrangement automatically positions a bottom mold upon closing movement of opposed mold platens. The cam arrangement eliminates the separate actuator or toggle heretofore used to position a bottom mold part.

BRIEF DESCRIPTION OF THE DRAWINGS

FIG. 9 is an end, elevational view of a pallet subassembly in accordance with the present invention;

FIG. 11 is a fragmentary, end elevational view of a portion of the oven transport subassembly showing the pallet loader elevator;

FIG. 16 is a perspective view of a preform transfer mechanism in accordance with the present invention;

FIG. 17a and FIG. 17b are fragmentary, elevational views of a portion of the preform transfer mechanism;

FIG. 18 is a fragmentary, top plan view of the preform transfer mechanism taken generally along line XVIII—XVIII in FIG. 17a;

FIG. 19 is a fragmentary, top plan view of the preform mechanism taken generally along line XIX—XIX of FIG. 17b;

FIG. 22 is a cross-sectional view taken generally along the line XXII—XXII of FIG. 21;

DETAILED DESCRIPTION OF THE PREFERRED EMBODIMENT

Figure 1:
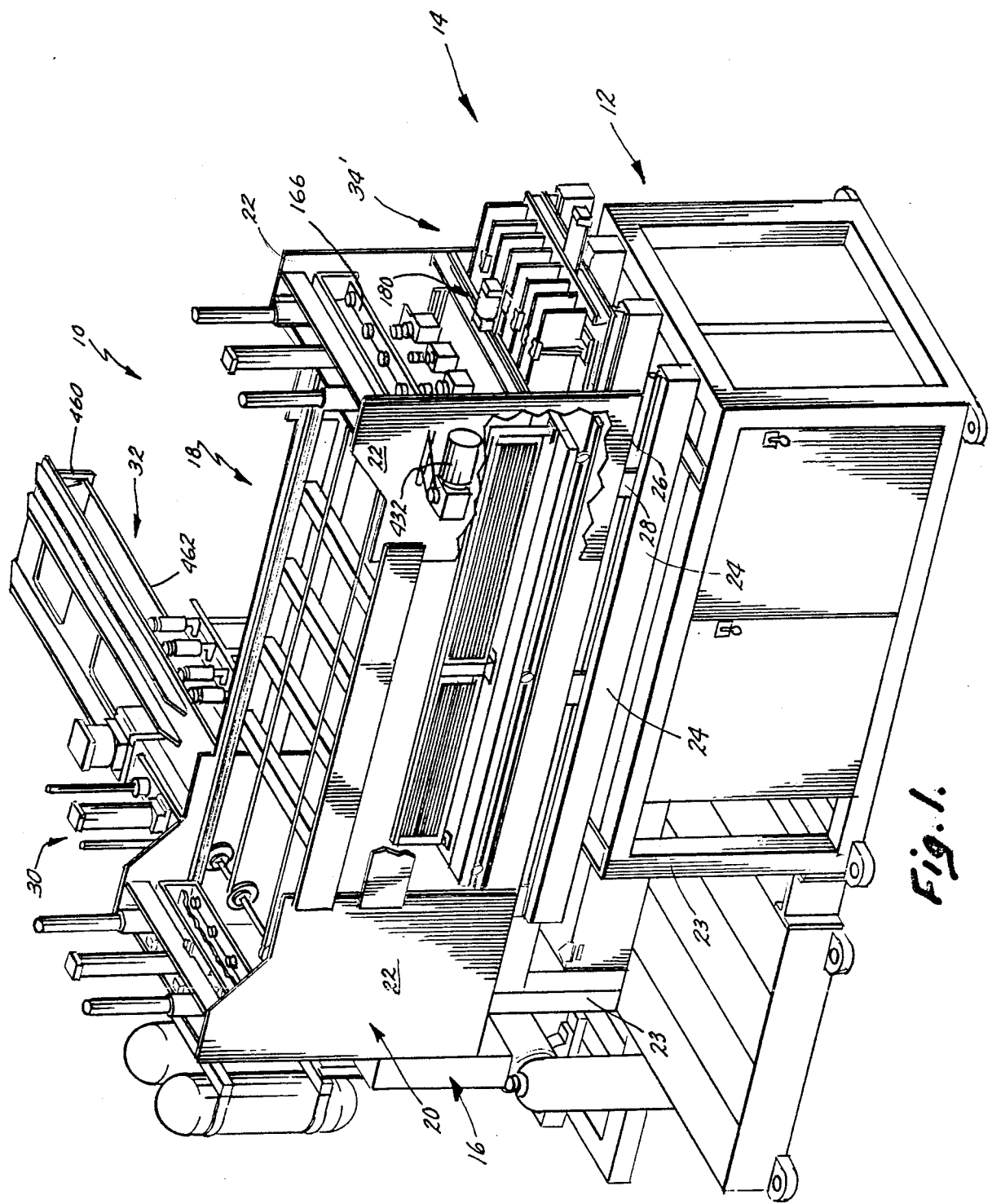
FIG. 1 is a perspective view of a reheat blow mold machine in accordance with the present invention.

A reheat blow mold machine in accordance with the present invention is illustrated in FIG. 1 and generally designated by the numeral 10. Machine 10 includes a base 12 having an infeed or loading end 14 and a discharge end 16. Supported on base 12 is an oven subassembly 18. Oven subassembly 18 includes a housing 20, side members 22, and supports 23. Positioned on top of base 12 are elongated beams 24 which support tracks 26. Supports 2 and hence oven subassembly 18 are supported on tracks 26 by linear bearing subassemblies or guides 28. As a result, oven subassembly 18 may be shifted longitudinally of base 12 for maintenance.

A blow mold station 30 is supported adjacent oven 18 at discharge end 16. A preform transfer mechanism 32 (FIGS. 1, 15 and 16) transports preforms from oven 18 to blow molding station 30. A preform loader subassembly 34 is positioned at the loading end 14 of apparatus 10. Loader subassembly 3 (FIG. 2) receives injection molded preforms 36 and positions them for loading into oven 18.

Preform Loader Subassembly

The presently preferred embodiment of the preform loader subassembly 34 is illustrated in FIGS. 2, 3, 4 and 5. As shown therein, assembly 34 includes a base 50 mounted on beams 23. Supported on base 50 are a plurality of parallel, spaced support plates 52, 54. Plates 52, 54 define longitudinally extending lanes 55.

Positioned at the entrance end of loader 34 are a plurality of preform receiving and positioning means 56. Each means 56 includes a leaf spring 58 mounted on plate 52 and a leaf spring 58 mounted on plate 54. Leaf springs 58 extend longitudinally along the support plates toward the entrance end to the oven. Secured to the free ends of springs 58 are preform engaging blocks or detents 60. Leaf springs 58 on each plate 52, 54 bias the blocks 60 towards each other. Blocks 60 are fabricated from a suitable plastic material such as that sold under the trademark Delrin. Opposed faces 62 of the blocks 60 are configured to conform to and positioned to engage and retain an upper finish or neck of a preform 36.

Figure 3:
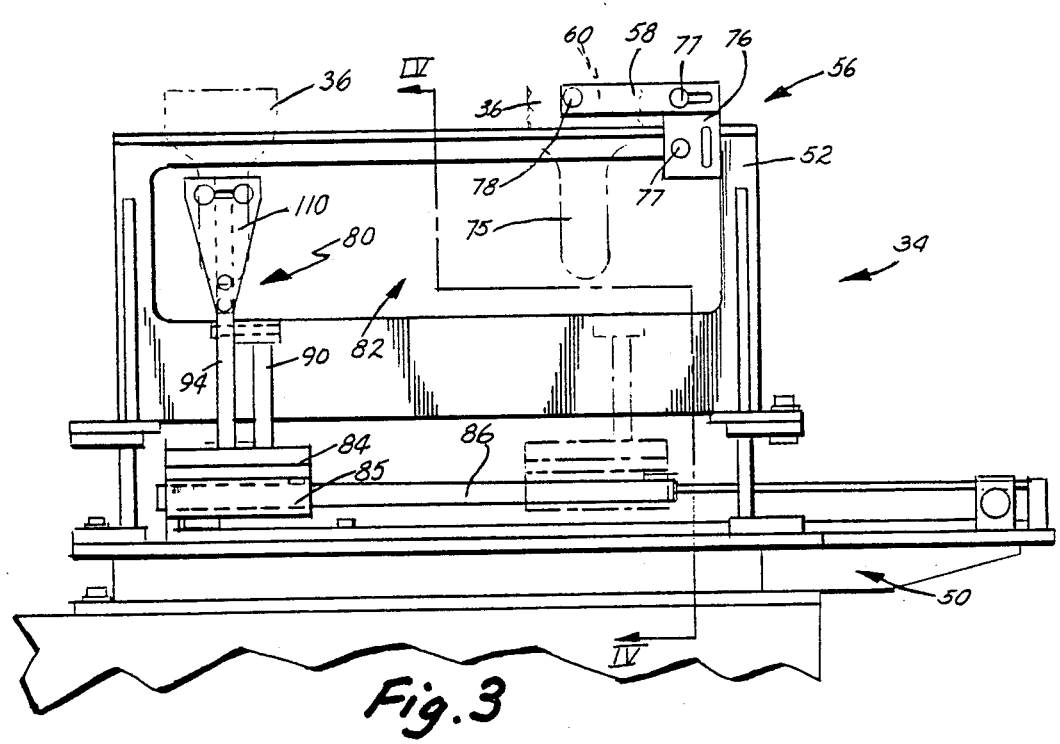
FIG. 3 is a side, elevational view of a preform loader subassembly.
Figure 4:
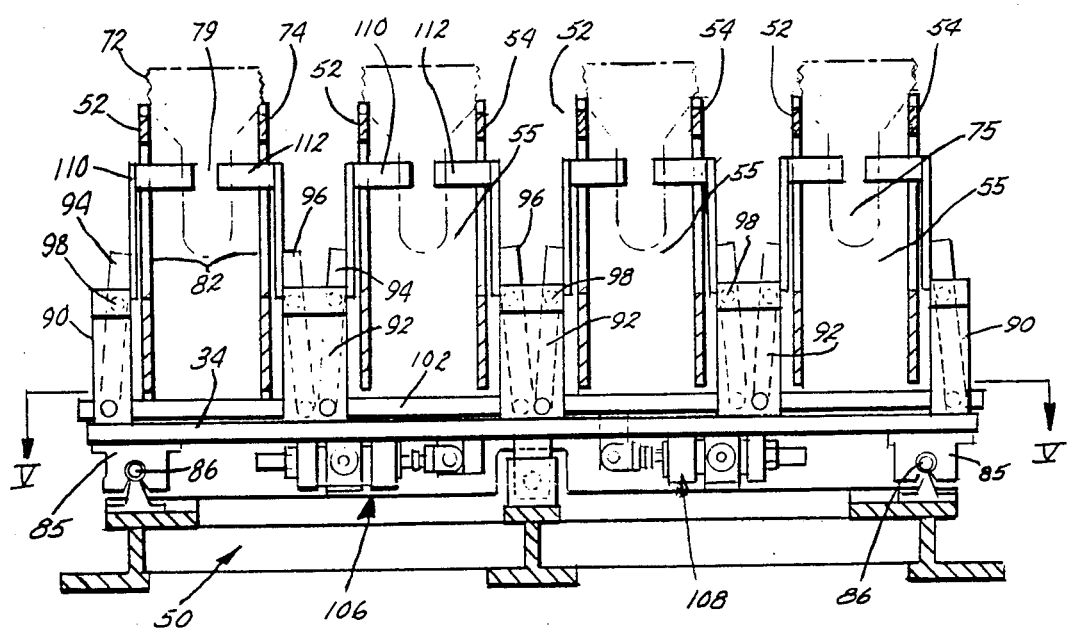
FIG. 4 is a cross-sectional view taken generally along line IV—IV of FIG. 3.

FIGS. 3 and 4 illustrate wide mouth preforms. Each preform includes an upper threaded portion 72, a support collar 74 which rests on plates 52, 54, and an elongated portion 75. As best seen in FIG. 3, leaf springs 58 are adjustably positionable on support plates 52, 54 through a mounting bracket 76 by suitable fasteners 77. Blocks 60 are secured to the free ends of leaf springs 58 by suitable fasteners 78. Blocks 60 are readily changed to accommodate larger or smaller diameter preforms. A conventional and commercially available descrambler and orientation unit delivers preforms to receiving means 56 in a known fashion.

Figure 5:
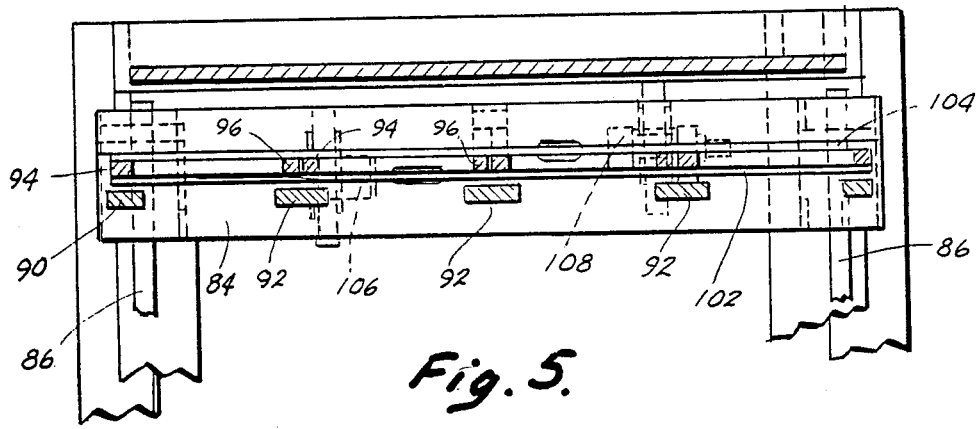
FIG. 5 is a cross-sectional view taken along line V—V of FIG. 4.

A jaw assembly 80 engages the preforms at the receiving means 56 and shifts them longitudinally of plates 52, 54 along the lanes to the infeed end of oven 18. Jaw assembly 80 operates through openings 82 in plates 52, 54. Jaw assembly 80 includes an elongated, transversely 30 extending carriage plate 84. Plate 84 includes carriages 85 which ride on tracks 86 (FIG. 4). A plurality of lever supports 90, 92 extend vertically from plate 84. Jaw levers or arms 94, 96 are pivoted to supports 90, 92 at pivot points 98. Levers 94, 96 define jaw arms. Levers 94 are pivoted at their lower ends to a front actuator bar 102 (FIGS. 4 and 5). Levers 96 are pivoted at their lower ends to a back actuator bar 104. Levers 94 are shifted by transverse movement of bar 102 through a piston cylinder actuator 106 (FIG. 4). Levers 96 are pivoted by a right jaw piston cylinder actuator 108. Jaws 110, 112 are secured to the top or free ends of levers 94, 96. Actuation of cylinders 106, 108 moves the jaws 110, 112 towards and away from each other to grasp and release a preform 36 positioned therebetween. The jaws are configured to engage the lower portion 79 of the preform. Carriage plate 84 and hence the individual jaws are shifted longitudinally of base 70 by a piston cylinder actuator 120 (FIG. 2) connected to plate 84.

In operation, a plurality of preforms are delivered to the receiving means 34. Jaw actuator cylinders 106, 108 move the jaws 110, 112 to their open positions. Carriage plate 84 is shifted by actuator 120 to its loading position so that the jaws are at blocks 60 of receiving means 56. Actuation of cylinders 106, 108 closes the jaws so that they grasp the preforms. Actuator 120 then shifts support 84 or rails 86 forward to the load position. The preforms are removed by the jaw assemblies from between blocks 60 and shifted to a forward position for loading into the oven.

Figure 6:
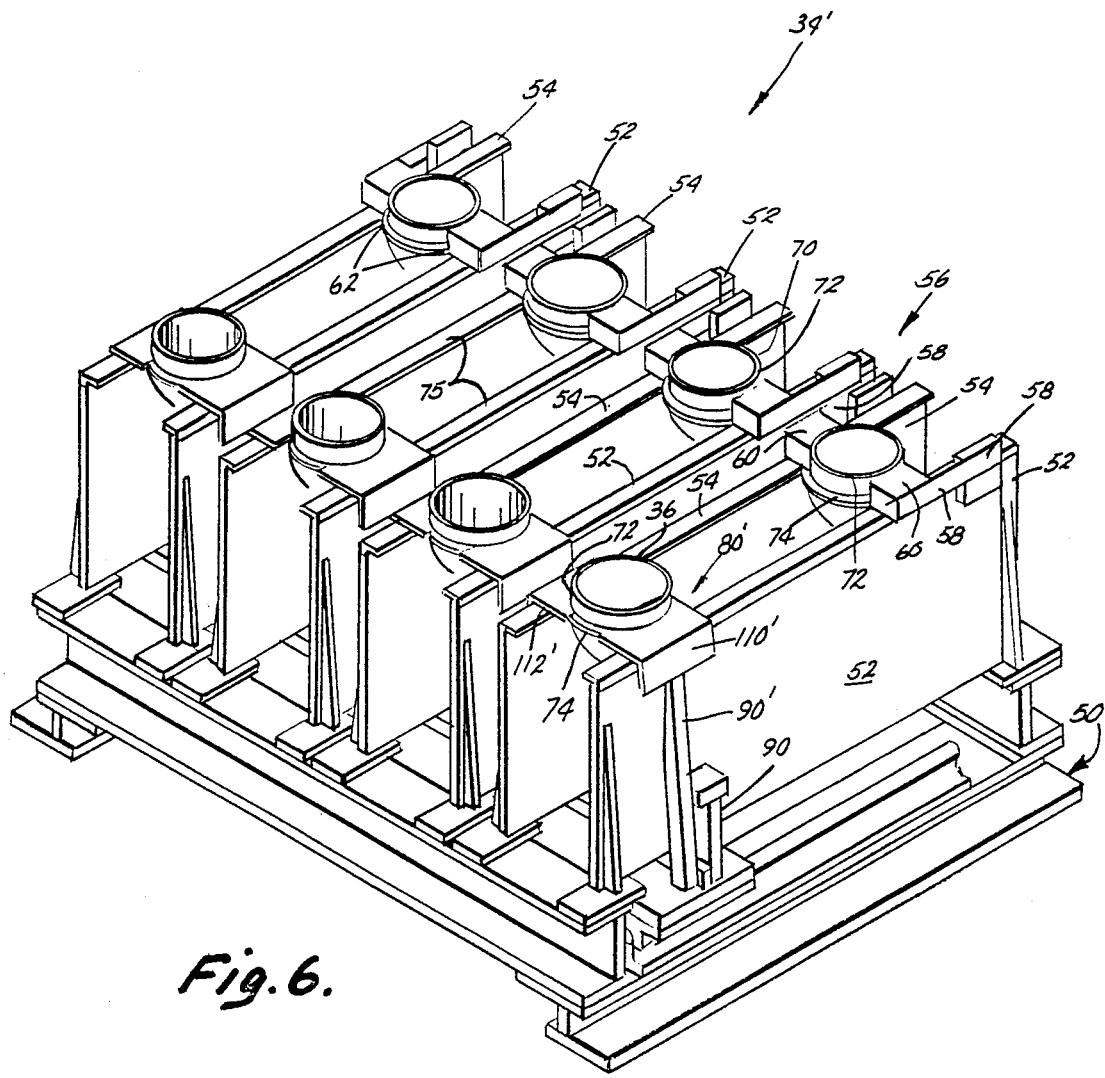
FIG. 6 is a perspective view of an alternative form of a preform loader in accordance with the present invention.

An alternative embodiment of the preform loader is illustrated in FIG. 6 and designated by the numeral 34'. Loader 34' differs from loader 34 principally in the jaw assemblies. As shown therein, jaw assemblies 80' include left jaw levers 94' and a right jaw lever (not shown) which support jaws 110', 112'. Jaws 110', 112' are positioned above the top surfaces of support plates 52, 54. Jaws 110', 112' are configured to engage the preforms 36 at their finished necks 72 immediately adjacent the support rings 74. At present, however, the embodiment illustrated in FIGS. 3 and 4 is preferred. Problems have been experienced with the operation of jaw assemblies which are designed to engage the neck finish portion. The jaws 110, 112 of the preferred embodiment engage the preform over a greater area and interference problems with the threaded neck are eliminated.

Oven

Figure 12:
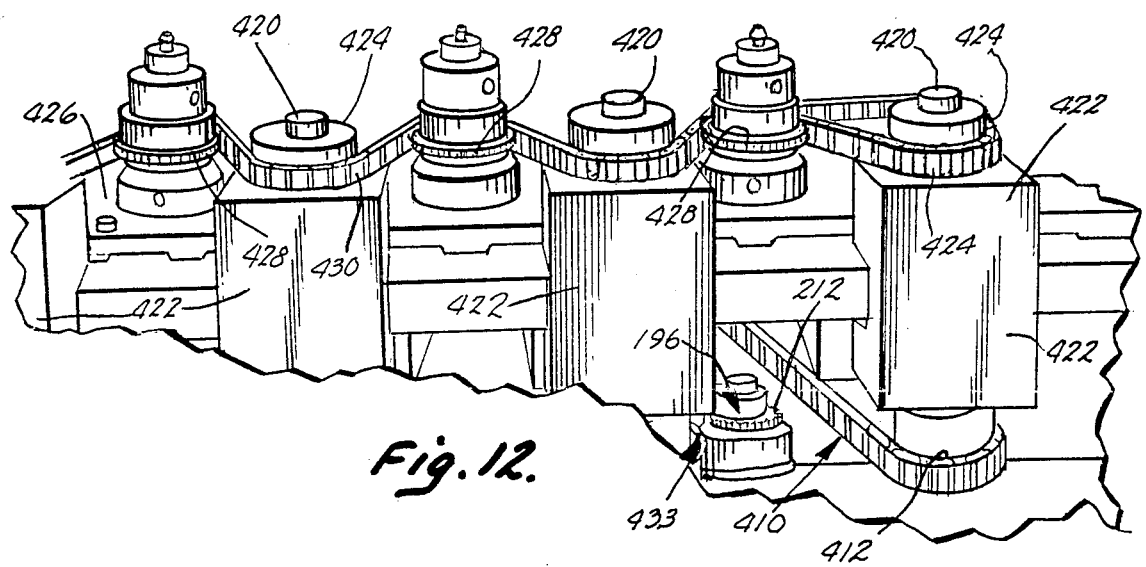
FIG. 12 is a fragmentary, end perspective view of the oven showing a portion of the collet rotation mechanism.
Figure 7:
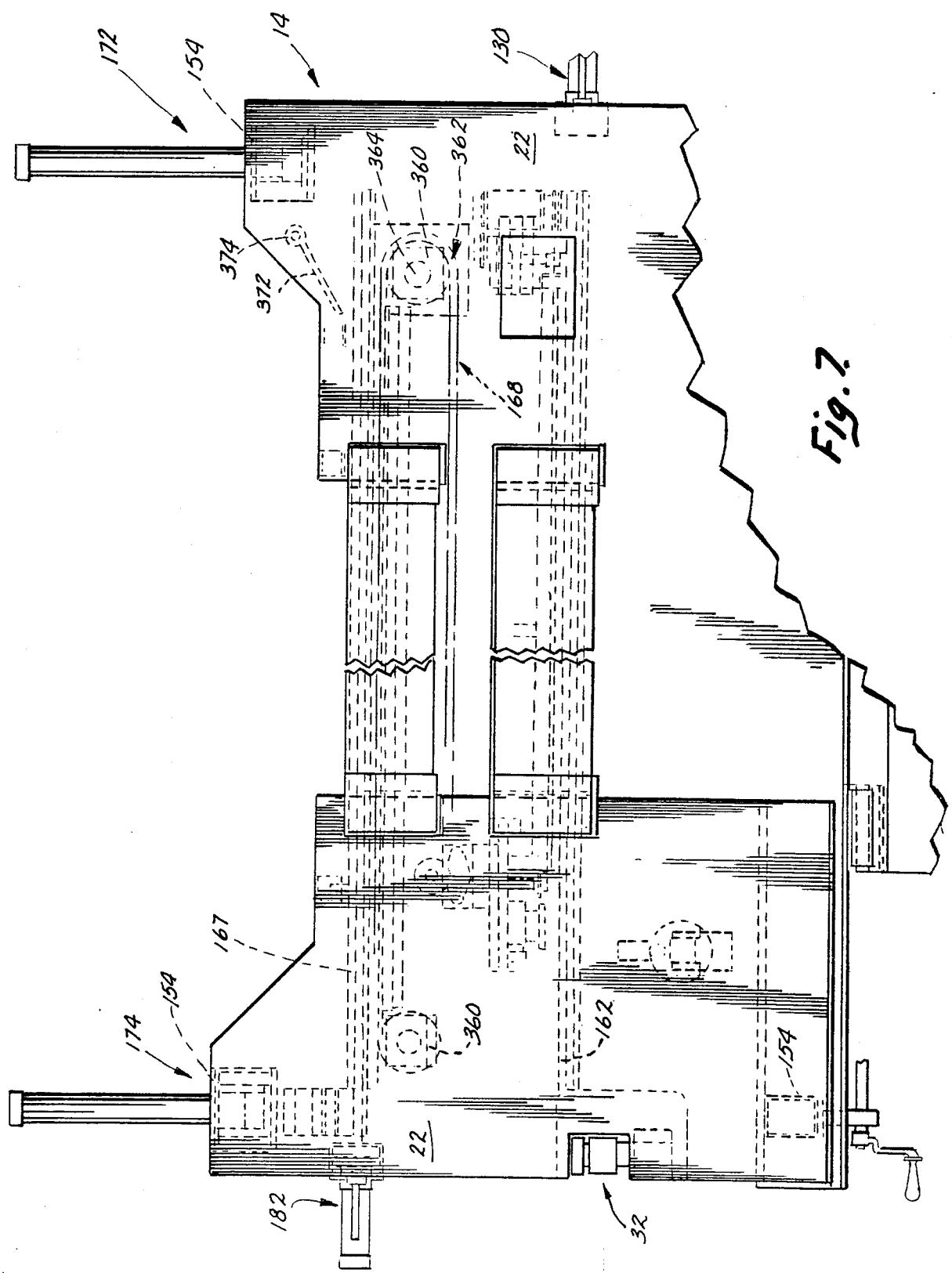
FIG. 7 is a fragmentary, side elevational view of the preform oven.
Figure 8:
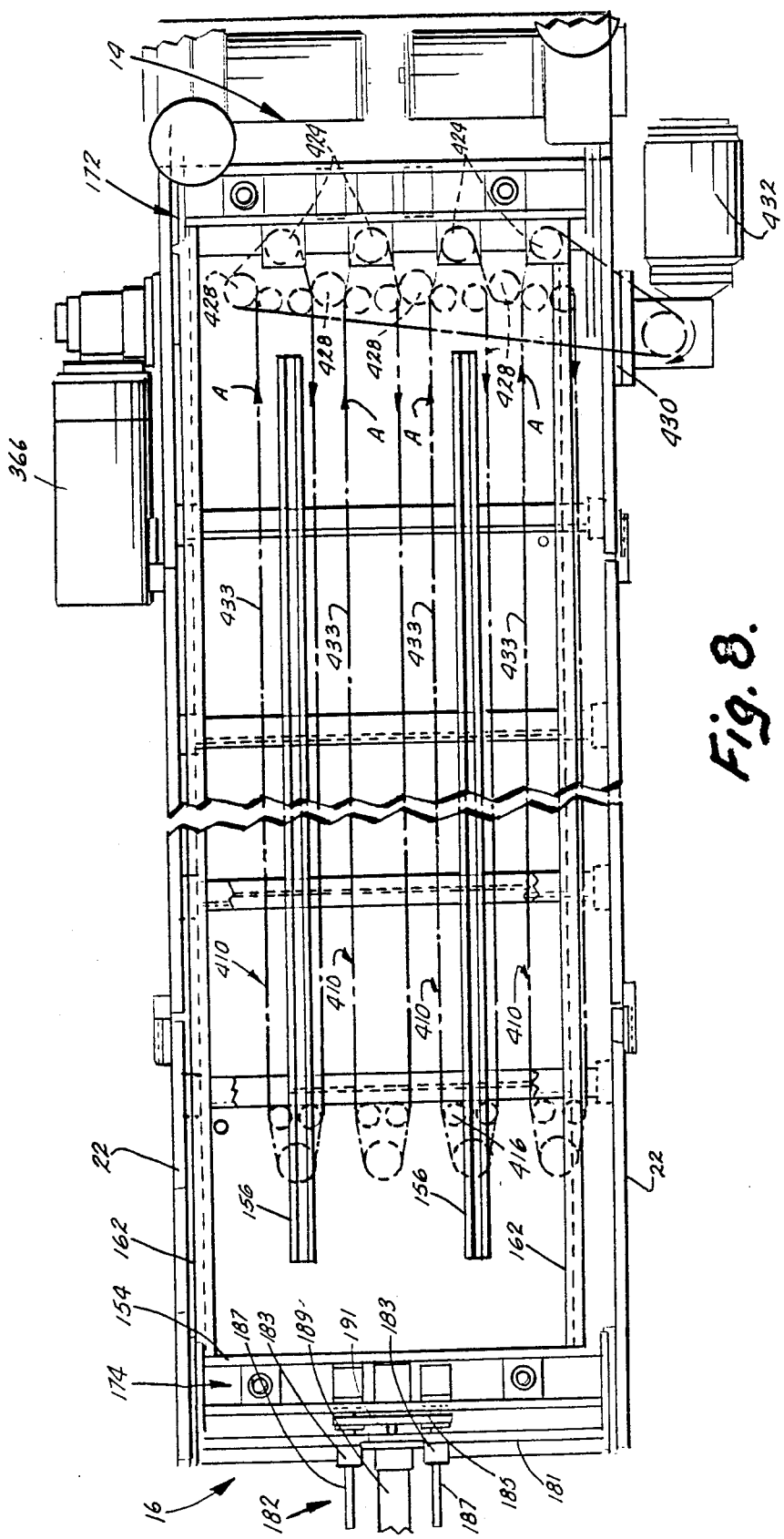
FIG. 8 is a fragmentary, top plan view of the preform oven.
Figure 13:
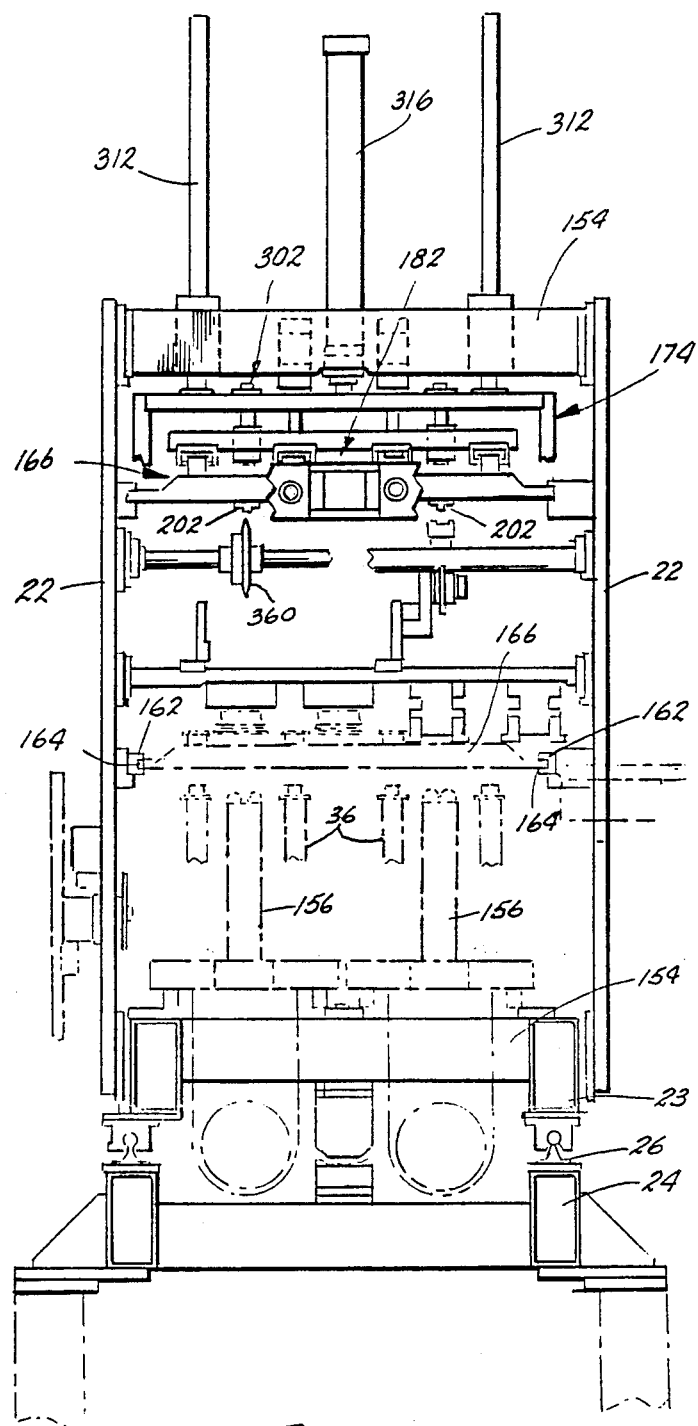
FIG. 13 is an end, elevational view of the oven.

As seen in FIGS. 1, 2, and 7–15, oven subassembly 18 includes an elongated base 12, sides 22 and cross pieces 154. As schematically shown in FIG. 13, heating elements and reflectors 156 divide the oven into a plurality of longitudinally extending lanes. Extending from end 14 to discharge end 16 along sides 22 are spaced, parallel tracks or guides 162 (FIG. 8). Tracks 162 define opposed, inwardly opening grooves 164 (FIG. 13). Grooves 164 and tracks 162 slidably support a plurality of pallet subassemblies 166 in tandem, abutting relationship.

Extending in vertically spaced, parallel relationship to tracks 162 are return tracks 167. Tracks 167 cooperate with a return conveyor subassembly 168 to move pallets from end 16 to end 14, as described in more detail below.

A return and load elevator 172 is supported at end 14. A discharge and return elevator 174 is supported on the base or frame structure at discharge end 16. Individual pallets 166 on tracks 162 are moved through oven 18 in a step-by-step fashion by a pusher piston cylinder actuator 180 mounted on the frame at the load end 14 (FIG. 7). Another pusher piston cylinder actuator 182 is positioned at discharge end 16 in line with return tracks 167.

Figure 15:
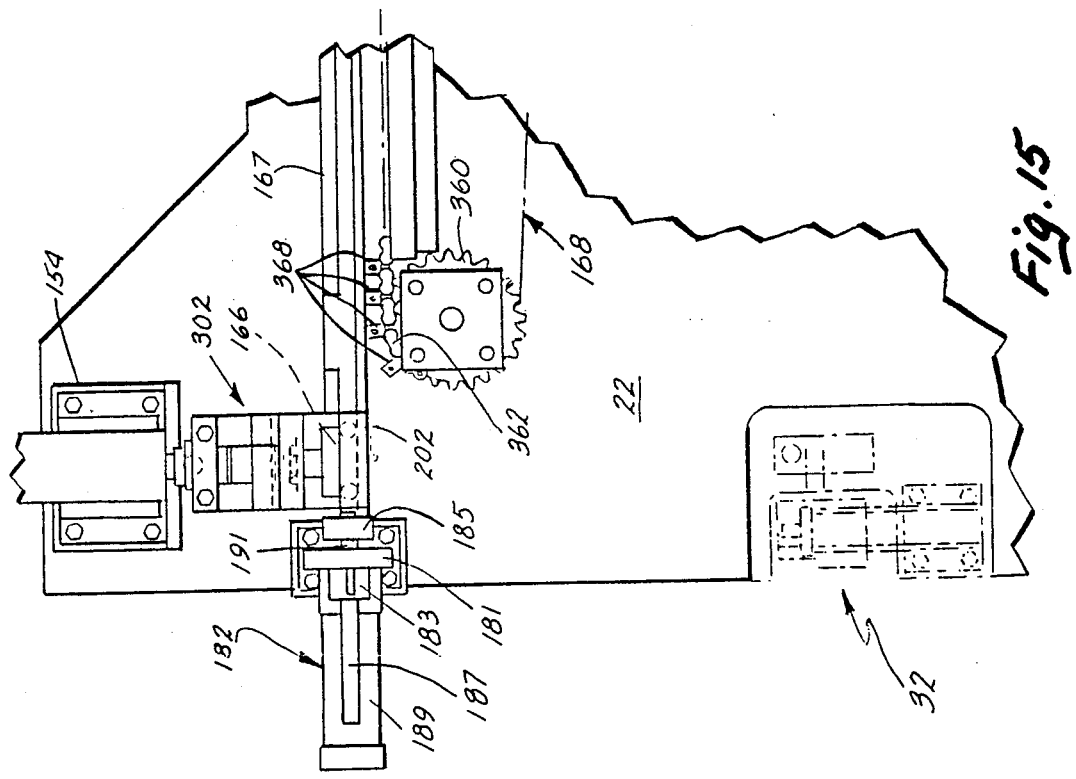
FIG. 15 is a fragmentary, side elevational view of the oven showing the discharge elevator, a portion of the pallet return conveyor and the location of the preform transfer mechanism.

Actuators 180, 182 are essentially identical in construction. As seen in FIGS. 8 and 15, each includes a transverse support 181 and bearing guides 183. A pusher bar 185 is supported on member 181 by guide rods 187 extending through guides 183. A piston/cylinder 189 has a piston rod 191 connected to bar 185. Extension of rod 191 moves the pallet off the respective elevator and onto the tracks.

As discussed in more detail below, actuator 180 removes a pallet from elevator 172 and positions it on track 162. As a pallet is positioned on track 162, a pallet at end 16 is moved onto elevator 174. Elevator 174 lifts the pallet until it is in line with return tracks 167. Piston cylinder assembly 182 moves the pallet off elevator 174 onto the track 167. The pallet is moved to the load end 14 of the oven by return conveyor subassembly 168. In this fashion, pallets are stepped through the oven and the preforms carried thereby are heated to the necessary temperature.

Figure 10:
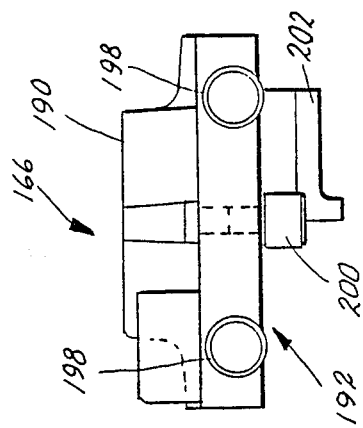
FIG. 10 is an end, elevational view of the pallet of FIG. 9.

The individual pallet subassemblies are best seen in FIGS. 9 and 10. Each pallet subassembly 166 includes a pallet shuttle 190 which has ends 192. Shuttle 190 defines a plurality of collet bores 194 which receive collet or coupling subassemblies 196. Shuttle 190 is also formed with spaced pads 197 on the front and back thereof which are engaged by pusher 185 of actuators 180, 182. Rollers 198, 200 are mounted at each end 192 of shuttle 190. Rollers 198 are received in grooves 164 of tracks 162 and the grooves of tracks 167. Positioned on an underside of shuttle 190 are spaced tabs 202. Tabs 202, as explained in more detail below, are engaged by conveyor subassembly 168 to move pallet 166 along tracks 167.

As shown in FIG. 9, pallet 166 is readily adaptable to different size finishes or preforms. Each collet or coupling subassembly includes a spindle 210 dropped within the bore. Spindle 210 is, therefore, rotatably mounted within bore 194 and also mounted for limited vertical movement. Spindle 210 has a sprocket 212 nonrotatably secured thereto. Washers 213 under sprocket 212 rest on the top of the shuttle. As explained below, sprocket 212 is rotated so that a preform carried by collet 196 is rotated uniformly as the pallet is stepped through the oven. A stripper cup 214 is secured on an underside of shuttle 190 concentrically with spindle 210 and bore 194. Stripper cup 214 includes a base 216 and a cylindrical sidewall 218. Secured to the free end of spindle 210 is a resilient coupling, nose cup or internal spring cup 220. Cup 220 includes a base 222 and a peripheral resilient lip 224. As seen in FIG. 9, lip 224 is dimensioned to engage an inner surface 226 of a preform 36. The vertical stroke of cup 220 is limited by the length of spindle 210. Spindle 210 engages a rotational bearing, bushing or surface within bore 194.

Cups 214 and cup 220 are configured for a wide mouth preform. Different sizes readily support smaller preforms. For example, a beverage bottle preform or narrow neck finish is also illustrated in FIG. 9 and designated by the numeral 234. Preform 234 engages a stripper cup 236. Cup 236 includes a peripheral mounting flange 238 and a generally cylindrical sidewall portion 240. Secured to spindle 210 is coupling or nose cup 242 which includes a resilient peripheral cylindrical sidewall 244. Sidewall 244 defines a beveled end 246 which resiliently engages the inner surface of preform 234. In both embodiments, the stripper cup is dimensioned to engage the top end of the preform with the resilient coupling disposed within the preform. Preforms are mounted on the collet subassembly simply by pushing them up and onto the coupling until they engage the stripper cup.

As best seen in FIG. 11, load elevator 172 includes a cross member 154 extending between sides 22 of the oven. Cross member 154 supports an elevator car 262. Elevator car 262 includes a base member 264 and depending sides or legs 266. Each leg defines a groove 268 dimensioned to receive the rollers of a pallet subassembly 166. A stop 269 on one leg 266 retains the pallet in the car. Extending vertically from member 264 are guide rods 270. Rods 270 are slidably mounted within guides 272. Elevator car 262 is raised and lowered with respect to cross member 154 by a piston cylinder actuator 274. Actuator 274 includes a cylinder 276 and a piston rod 278. Rod 278 is fixed to member 264 generally centrally thereof.

Figure 2:
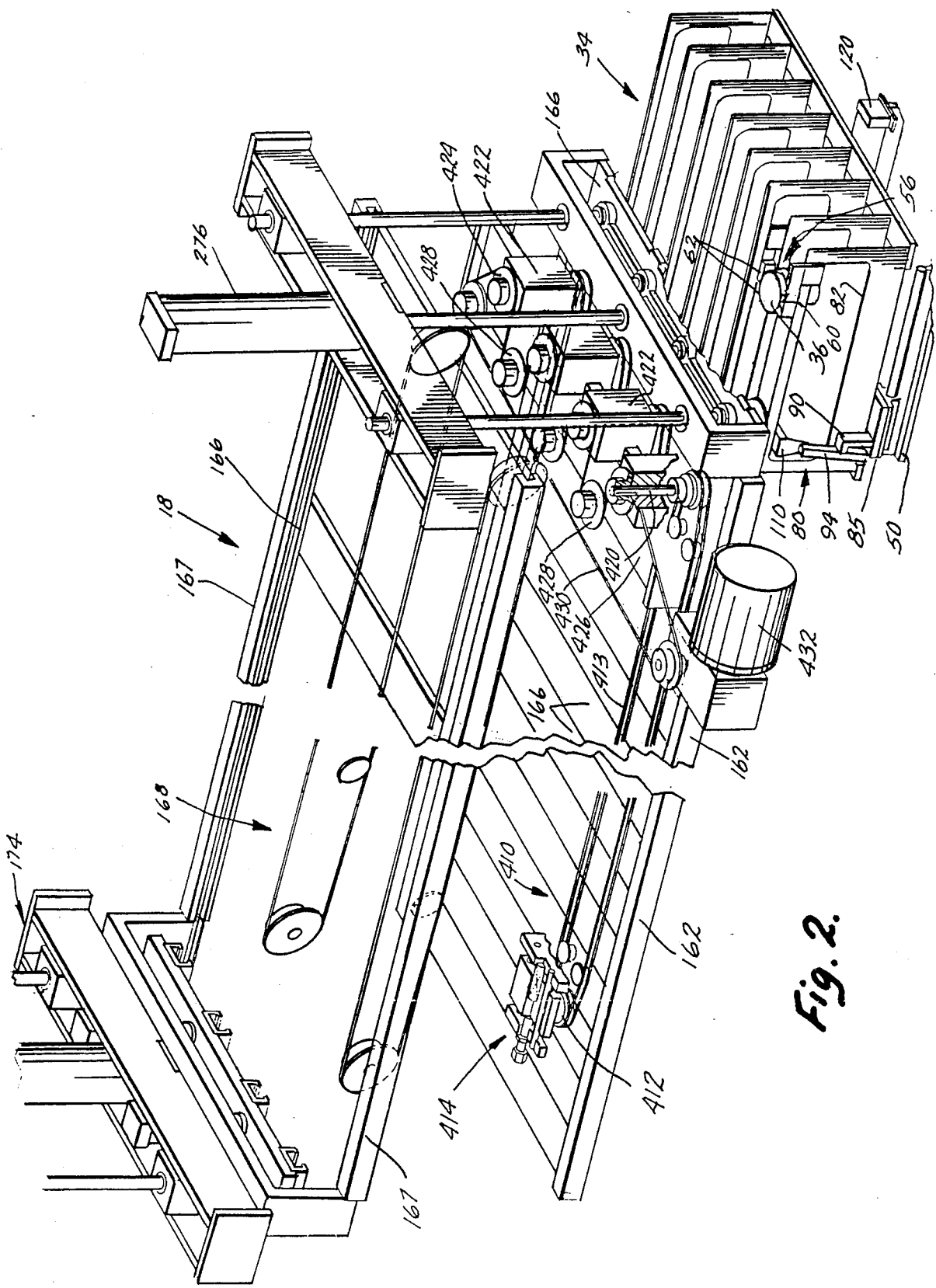
FIG. 2 is a simplified, perspective view of the oven transport subassembly and a preform loader subassembly in accordance with the present invention.

As shown in FIG. 2, a plurality of preforms are positioned appropriately by the preform loader subassembly 34 directly beneath elevator 172. Upon actuation of cylinder actuator 274, car 262 and hence a pallet 166 move downwardly. The noses or couplings 220, 234 of pallet subassembly 166 will be pressed into the open ends of the preforms. Pallet 166 is then positioned in line with tracks 162. Once the preforms are pushed onto the noses of the pallet subassembly, the jaws of the loader subassembly 34 are opened and cycled to pick up the next set of preforms. The pallet 166 is moved off of elevator 172 by actuator 180 and onto the tracks.

Figure 14:
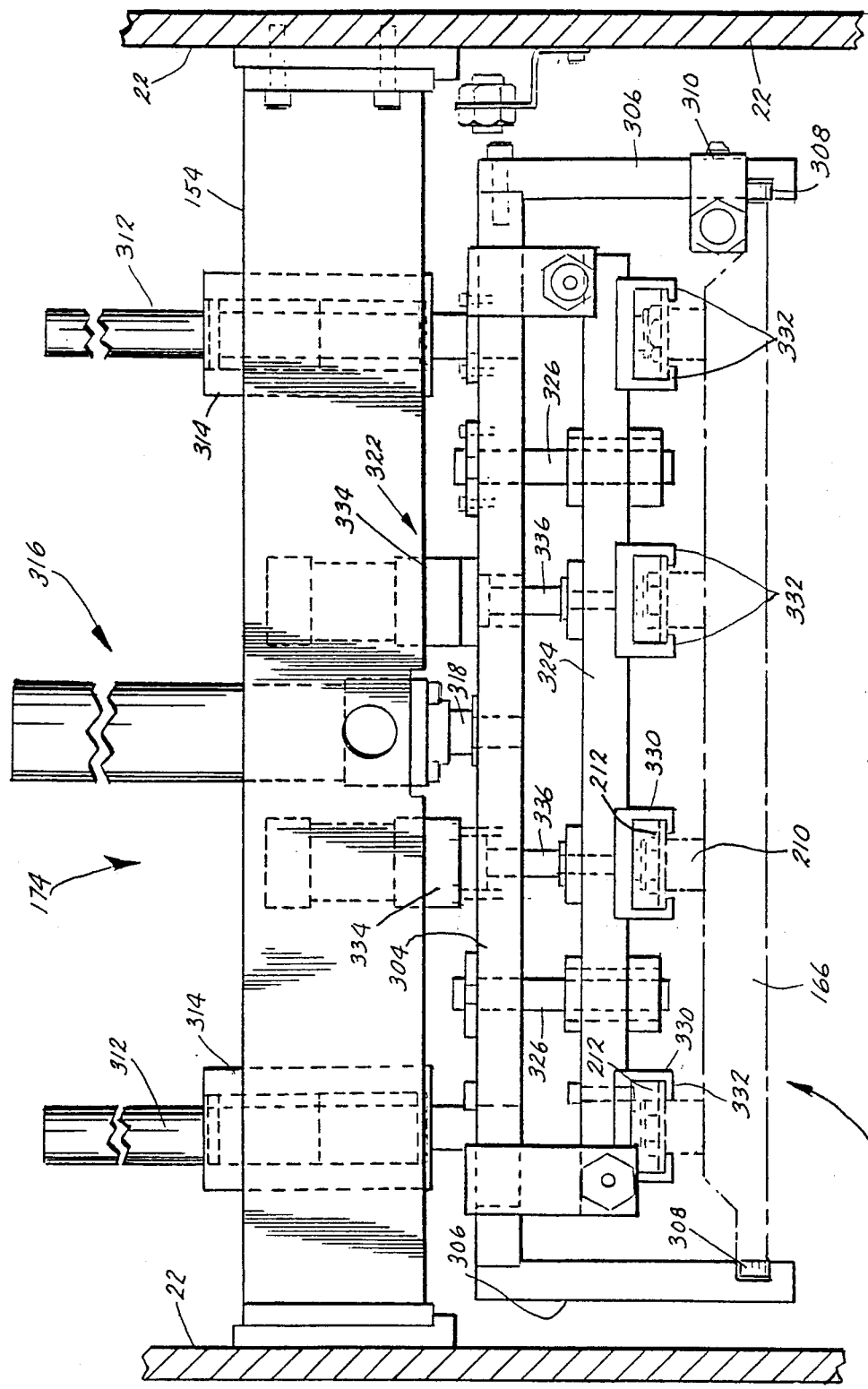
FIG. 14 is a fragmentary, end elevational view of the oven showing the discharge elevator subassembly.

Discharge elevator 174 is best seen in FIGS. 13 and 14. Elevator 174 includes a cross piece 154 and an elevator car 302. Car 302 includes a base member 304 and depending sides or legs 306. Legs 306 define grooves 308 dimensioned to receive the rollers of a pallet 166. A stop 310 is supported on a leg 306 at a groove 308. Extending from base member 304 are guide rods 312. Rods 312 are supported for vertical reciprocal movement in guides 314. Elevator 302 is raised and lowered by a piston cylinder actuator 316. Actuator 316 includes a piston rod 318 secured to base 304.

Discharge elevator 174 also includes a preform stripper mechanism 322. Stripper mechanism 322 includes an elongated stripper bar 324 supported for vertical movement on guide rods 326. A plurality of generally channel-shaped members 330 are secured to an undersurface of bar 324. Members 330 include inwardly turned stripper fingers 332. Members 330 are dimensioned to receive sprockets 212 on the spindles 210 of the pallet subassemblies. Stripper bar 324 is raised and lowered by piston cylinder actuators 334 mounted on base 304. Actuators 334 each include a piston rod 336 secured to stripper bar 324.

Elevator 174 is initially positioned with grooves 308 aligned with tracks 162 and stripper actuator cylinders 334 extended. When in this position, a pallet is moved off the tracks and onto car 302 in grooves 308. Sprockets 212 of each collet or coupling subassembly are received within stripper members 330. At this point, as seen in FIG. 7, pallet 166 and the supported preforms will be positioned at the preform transfer mechanism 32. Mechanism 32 grasps the preforms and stripper actuators 334 are shifted vertically to raise stripper bar 324. This action raises the spindles 210 on pallet 166. The resilient nose cups, as schematically shown in FIG. 9, are pulled out of the open necks of the preforms thereby stripping the preforms from the pallet subassembly. Discharge elevator actuator 316 is then retracted to raise car 302 to position pallet 166 in line with tracks 167. Pallet 166 is moved off of car 302 by pusher actuator 182 and onto tracks 167.

Return conveyor 168 includes spaced sprockets 360 supporting an endless roller chain 362. Sprockets 360 at the load end of the oven subassembly are supported on a common axle 364. Axle 364 is driven by a drive motor 366 (FIG. 8). A plurality of drive dogs 368 (FIG. 15) are secured to chain 362. The drive dogs engage depending tabs 202 on the pallet subassembly. As a result, the chain conveyor pushes the pallet along the return tracks 167 to the load end of the oven.

As seen in FIG. 7, tracks 167 extend beyond sprockets 360 and terminate at load elevator 172. When elevator 172 is in the raised position, three pallets will be at the load end of the oven. One pallet will be on the load elevator car. When elevator 172 is lowered, two pallets will remain at the discharge end of conveyor 170 and out of engagement with the drive dogs. When the elevator returns to its raised position to receive another pallet, conveyor 168 is actuated. A single pallet moves along the conveyor and engages the two pallets shifting the right-most one onto the elevator. A flipper bar 372 permits manual unloading or transfer of the pallets from the track onto the elevator. Rotation of bar 372 about a pivot axle 374 causes it to engage the pallets on the track and move them towards elevator 172.

As seen in FIGS. 2, 8 and 12, provision is made for rotating the collets or preform support couplings on the pallets 166 uniformly and in the same direction as they are moved through the oven. A plurality of endless chains 410 extend around sprockets 412 at the load end of the oven and around chain adjusters 414. The runs of chain 410 are positioned about reflectors or heating elements 156 by spreader sprockets 416. Sprockets 412 are supported on shafts 420 by bearing subassemblies 422. Shafts 420 include driven sprockets 424. Also supported on a cross piece 426 (FIGS. 2 and 12) are idler sprockets 428. Sprockets 424 are driven in the same direction by a drive chain 430 which extends around idler sprockets 428. Drive chain 430 is driven by a suitable drive motor 432 (FIGS. 2 and 8). Uniform rotation of chains 410 is achieved by the drive with each chain moving in the direction of arrows "A" in FIG. 8. As seen in FIG. 13, pallets 166 are moved into the oven along tracks 162 and the sprockets 212 of each of the collet assemblies engage a run 433 of the chains 410. The sprockets and hence the preforms supported by the pallets will all rotate uniformly in the same direction and at the same speed. The preforms are continuously rotated while the pallet subassemblies are moved through the oven in a stepwise fashion.

The oven, due to its open top construction, solves problems inherent with prior oven constructions. Previously, the oven was completely closed and heat build up problems were experienced. With the oven in accordance with the present invention, the preforms are moved immediately adjacent the longitudinally extending heating elements 156. The preforms are continuously rotated to assure even heating. The pallet transport arrangement is of reduced complexity. Increased reliability is obtained.

Preform Transfer Subassembly

Preform transfer subassembly or mechanism 32 is best illustrated in FIGS. 16-25. Mechanism 32 includes an elongated transfer or actuator bar 450, a preform jaw assembly 452, a product jaw assembly 454 and a transfer bar actuator 456. Actuator 456 is supported adjacent the mold station of the machine by supports 458, 460 (FIGS. 1 and 16). Extending between supports 458, 460 are guide rods 462. Slidably mounted on guide rods 462 is a slide or carriage 464. Carriage 464 defines a slot 466. A rotary actuator 468 includes an actuator arm 470. A roller 472 on the end of arm 470 is received within grooves 466. Transfer or actuator bar 450 is directly connected to carriage 464. Bar 450 is supported on the machine by a plurality of support brackets 474. A rail 476, having a dovetail shape in cross section, is slidably received by brackets 474. Rail 476 is fastened directly to the upper surface of transfer bar 450. As a result, rotation of actuator arm 470 through an angle of 180° will translate or shift bar 450 so that jaw assembly 454 is moved from schematically shown molds 480 to a product eject position while moving jaw assembly 452 to the molds to thereby transport the heated preforms to the mold station.

Due to the length of bar 450, support at its outer end may be necessary to prevent flexing as bar 450 is cantilevered from brackets 474. As shown in FIG. 16, a support including an elongated beam 453 has mounting plates 455 which mount the beam to the blow mold station. Mounted on beam 453 is a track or guide 457. A glide, carriage or linear ball bearing assembly 459 is, secured to end 461 of bar 450. Assembly 459 reciprocates on track 457 and supports bar 450.

Jaw assembly 452, as illustrated in FIGS. 17b and 19, includes four jaw sets 482. Each jaw set 482 includes a generally L-shaped support bracket 484. Bracket 484 includes a vertical leg 486 fastened to transfer bar 450 and a horizontal leg 488. Jaws 490, 492 are pivotally mounted to bar 450. Each jaw 490, 492 includes a portion 494 which defines a curved inner face 496 configured to conform to the shape of the preform neck. The jaws further include a lever or actuator arm portion 498. Portion 498 terminates in a semi-circular shaped actuator arm 500. The jaws 490, 492 are pivoted to bracket leg 488 or bar 450 by pivot pins 502 (FIG. 22).

The right-hand jaws 490 are pivoted between open and closed positions by a slide bar 510. The left jaws are shifted between open and closed positions by an upper left slide bar 512. Each slide bar 510, 512 defines a pocket means 514. Pocket means 514 is defined by an outwardly opening groove or slot 516. Positioned within slot 516 is a slidable plunger 518. Plunger 518 defines a slot 520 which receives a guide pin 522. A spring 524 is disposed within a bore 526 defined by plunger 518. Spring 524 is also disposed within a fixed member 530 which is secured to a respective slide bar 510, 512. Spring 524 biases plunger 518 into engagement with actuator 500 of jaw portion 498.

To open jaws 490, bar 510 is shifted to the left when viewed in FIG. 19. Jaw 490 pivots about pin 502 to the open position illustrated in phantom. To close jaw 490, slide bar 510 is shifted to the right. The spring biased plunger 518 compensates for variances in the diameter of the preform. Should the preform be of slightly larger diameter, plunger 518 will shift against the bias of spring 524. The action of slide bar 512 is identical. Jaws 490 and 492 differ slightly. With jaw 492, actuator arm 500 extends above the horizontal plane of jaw portion 494 so that it may be received within the pocket 518 defined by the upper slide bar 512.

Figure 20:
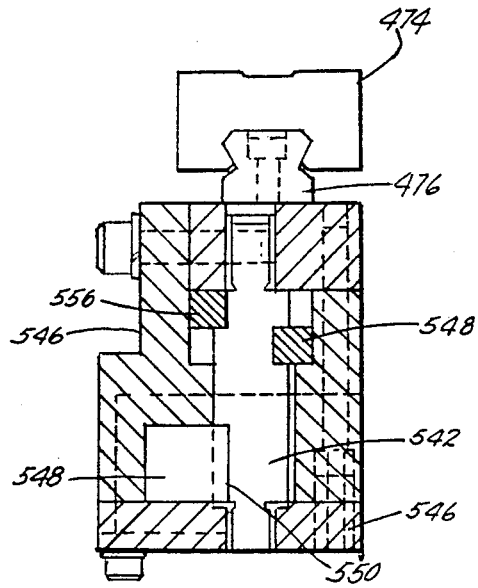
FIG. 20 is a cross-sectional view taken generally along line XX—XX of FIG. 17b.

Slide bars 510, 512 are actuated in opposite directions to open and close the jaws 490, 492 by an actuator 540. Actuator arrangement 540 (FIGS. 17b, 19 and 20) includes a double acting piston cylinder subassembly 542 having a piston rod or actuator rod 544. Piston cylinder or actuator 542 is supported on bracket or support plates 546. Connected to rod 544 is an actuator rack 548. Rack 548 defines teeth 550. A pinion 552 is mounted between plates 546. A lower end of the pinion meshes with rack 548. An upper portion of the pinion meshes on one side with an upper left slide rack 556 and an opposite side with the lower slide rack 548. As seen in FIGS. 19 and 20, rotation of pinion 552 in a clockwise direction shifts bar 510 to the right and upper bar 512 to the left which closes jaws 490, 492 against the neck of the preform. Rotation of the pinion in the opposite direction opens the jaws.

Figure 17A:
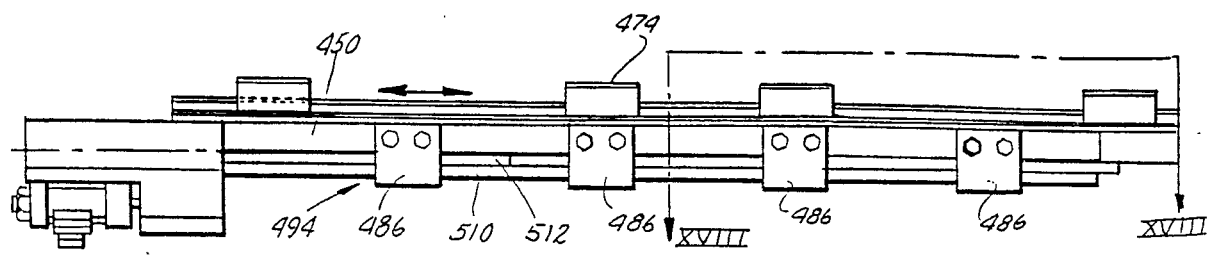
Figure 18:
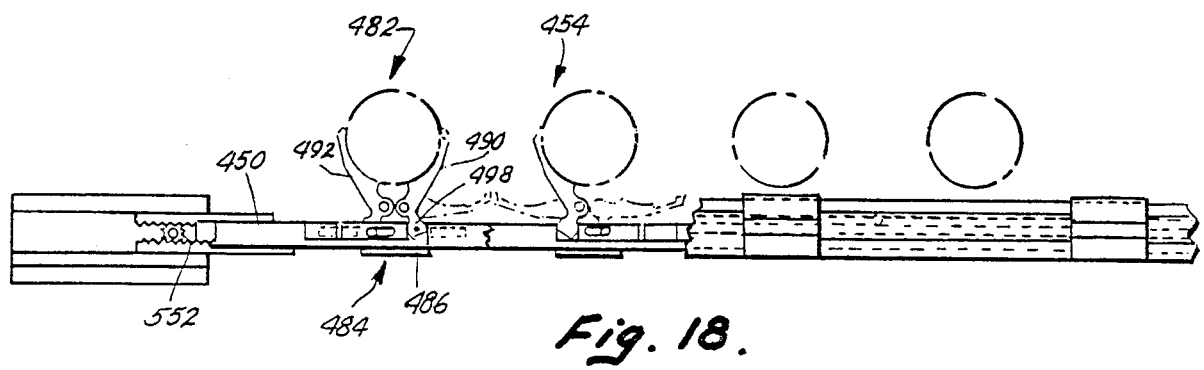

Product jaw assembly 454, shown in FIGS. 17a and 18, is identical to preform jaw assembly 452. Assembly 454 similarly includes L-shaped brackets 486, and left and right-hand jaws 490, 492 and slide bars 510, 512. The slide bars are shifted in opposite directions through an other actuator 540 which includes a pinion 552 engaging rack portions of the slide bars.

Figure 23:
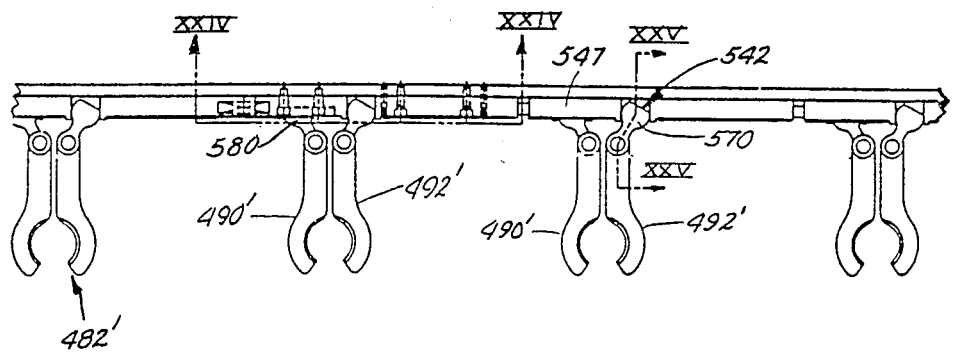
FIG. 23 is a fragmentary, top plan view of an alternative and presently preferred embodiment of a portion of the preform transfer mechanism.
Figure 24:
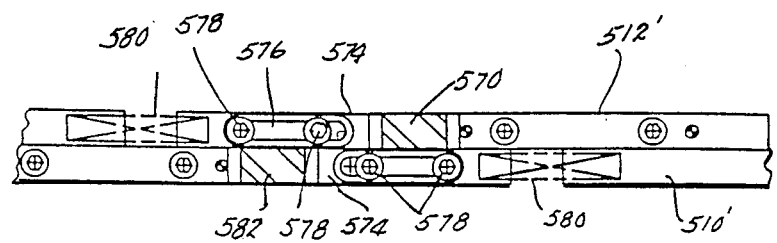
FIG. 24 is a cross-sectional view taken generally along the line XXIV—XXIV of FIG. 23.
Figure 25:
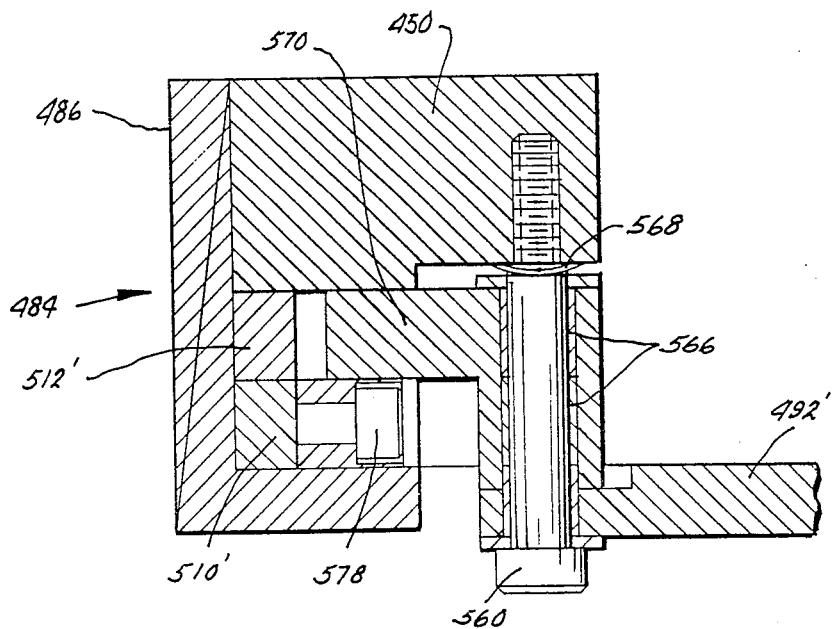
FIG. 25 is a cross-sectional view taken generally along the line XXV—XXV of FIG. 23.

A presently preferred jaw and jaw actuator structure is illustrated in FIGS. 23, 24 and 25 as an alternative embodiment. The two structures, as is clear from a comparison of FIGS. 17a, 17b, 18 and 19 with FIGS. 23, 24 and 25, have the same basic elements. The preferred preform transfer mechanism includes the elongated bar 450 which supports a plurality of jaw sets 482'. Each jaw set 482' includes a jaw member 490' and a jaw member 492'. The jaw members are opened and closed by upper and lower slide bars 510' and 512'. The bars are positioned on member 450 by brackets 484 (FIG. 25). The jaw members 490' and 492' are pivoted to support 450 by bolts 560 (FIG. 25). The brackets do not support the jaw members. An actuator arm 570 is layed to a vertical, cylindrical portion 562 of an actuator arm 570. Portion 562 defines a bore 564. A plurality of bushings 566 are disposed within the bore. A spring washer 568 biases portion 562 into engagement with jaw member 492' to insure that they remain keyed together.

Actuator arm portion 570 of jaw 492' has a generally semi-circular shape in plan (FIG. 23). A portion 570 is disposed within a slot or pocket 572. Pocket 572 is defined by a plunger 574. It is seen in FIG. 24, plunger 574 includes an outwardly opening slot 576. Fasteners 578 extend through slot 576 to slidably mount plunger 574 on actuator bar 512' A spring 580 biases plunger 574 against actuator arm portion 570 of jaw member 492'. Similar oversize compensation structure is carried by actuator bar 510'. Such structure includes a plunger 574 slidably mounted to bar 510 by fasteners 578. Plunger 574 is biased into engagement with actuator portion 582 of jaw member 490' by a spring 580. The jaw, over travel compensation structure, and actuator bar as illustrated in FIGS. 23-25 is presently preferred. The minor changes noted improve the operation of the preform transfer mechanism.

The sequencing of preform transfer mechanism 32 is as set forth in commonly owned U.S. Pat. No. 4,709,803. Jaw subassembly 452 is positioned on bar 450 so that each jaw set 482 receives a preform supported on a pallet 166 at the oven. Actuators 540 close the jaw sets to engage the preforms. The stripper subassembly of the discharge elevator is actuated and the pallet is moved vertically. Drive 456 shifts rod 450 to the right when viewed in FIG. 16. The jaw sets of assembly 452 are positioned at the open mold halves 480. The jaw sets of assembly 454 are shifted to the open ejection area between guide bars 462. The jaw sets of each assembly are opened and bar 450 is shifted back to the left by actuator 456. The jaws of each assembly are then closed. The jaws of assembly 452 grasp another set of preforms. The jaws of assembly 454 grasp the neck portions of the preforms in the blow molds which have been formed into the desired product. When the molding process is completed, the mold halves are opened and the cycle is repeated. Various sizes of preforms are readily accommodated by the transfer mechanism. The closed diameter of the jaw sets may be adjusted by replacing the jaws or by mounting inserts on the jaw faces.

Blow Molding Station

Figures 21, 26:
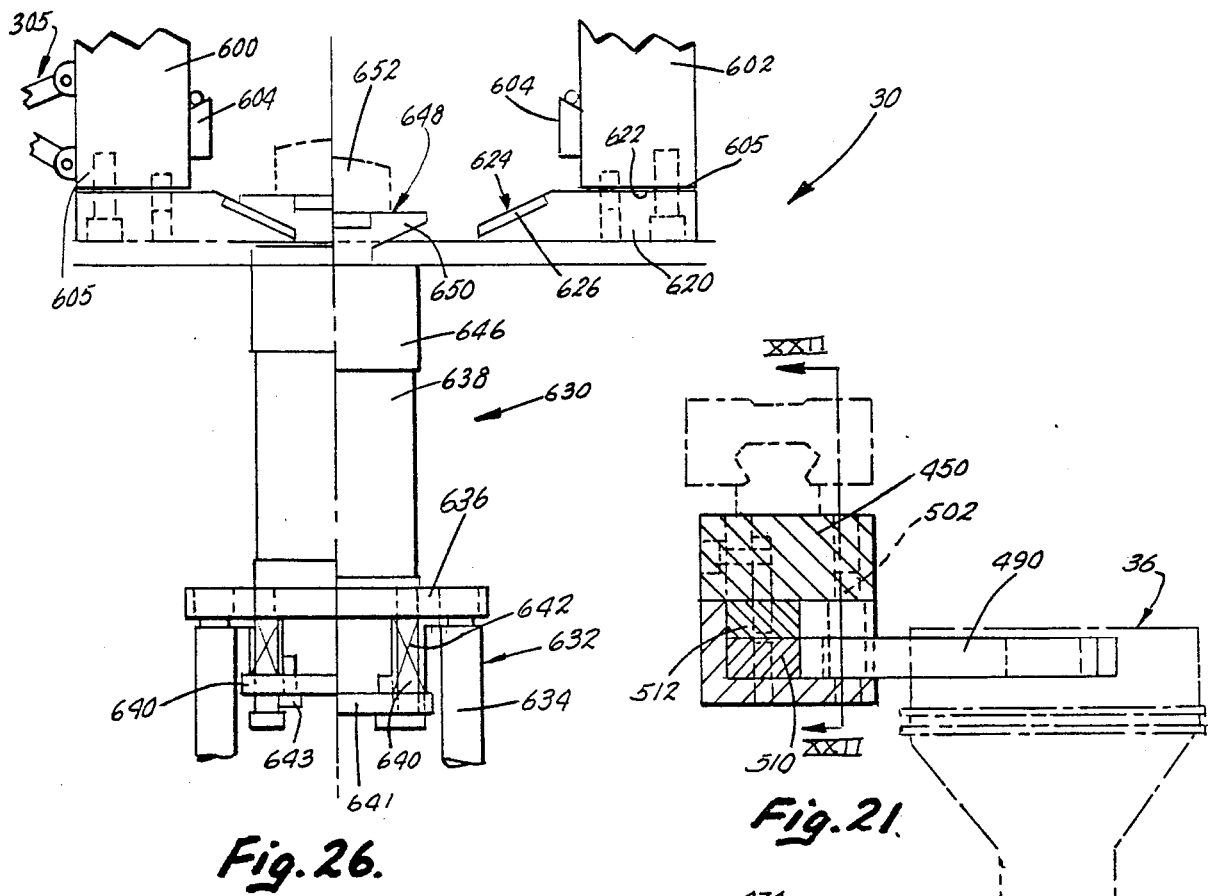
FIG. 21 is a cross-sectional view taken generally along the line XXI—XXI of FIG. 17b.
FIG. 26 is a fragmentary, side elevational view of a blow mold station showing a bottom mold platen and cam actuator in accordance with the present invention.

The blow molding station 30 is essentially conventional in nature. As described in the aforementioned U.S. patents, a typical blow mold assembly includes a blow head. A stuffer and center rod assembly seals off the open ends of the preforms when they are positioned between the mold halves. The head blows air into the preforms which are stretched by extension of a center rod. Station 30, as illustrated in FIG. 26, includes right and left-hand platens 600, 602. The platens support mold halves on brackets 604 in a conventional fashion. The platens and hence the mold halves are opened and closed about the preforms by partially shown toggle actuators 605. With certain products, a bottom mold half is also used. A bottom platen heretofore has been moved vertically by a toggle mechanism or other form of separate actuator. In accordance with the present invention, a separate toggle actuator for a lower platen is eliminated.

As shown in FIG. 26, platens 600, 602 have lower ends 605. Secured to the lower ends are cam plates 620. Each cam plate includes a mounting surface 622 and an angled cam surface 624. Surface 624 is defined by a replaceable insert 626. In the right half of FIG. 26, a lower platen subassembly 630 is illustrated in its lowered or inoperative position. Platen assembly 630 includes a support frame 632 having legs 634 and a cross piece 636. Supported on cross member 636 is a lower mold platen 638. Bolts or support rods 640 are threaded to frame 632. A plate 641 defines apertures through which bolts 640 extend. Platen 638 rests on plate 641 and is secured by bolts 643. Springs 642 encircle rods 640 and bias plate 641 downwardly.

A cam follower member 648 is secured to upper end 646 of platen 638. Follower member 648 includes angled surfaces 650 which are complementary to cam surfaces 624. A mold bottom 652 is mounted on top of member 648.

In operation, platens 600, 602 are moved towards each other to close the mold supported thereon. As cams 620 engage surfaces 650, bottom mold platen 638 is shifted vertically to position mold bottom 652 relative to platens 600, 602. Cam plates 620, as shown in the left-hand side of FIG. 26, lock the mold bottom in proper position. The cam structure in accordance with the present invention by eliminating a toggle actuator, reduces mold cycle time. This results in increased production. The cam actuator provides increased reliability and reduced wear. When a mold bottom is not required, cam plates 620 are simply removed from vertical platens 600, 602.

Operation

In view of the foregoing description, the operation of the subject invention should now be readily apparent.

Injection molded preforms are positioned at the loader subassembly 34 at blocks 60. The loader jaw subassembly 80 is actuated to grasp all four preforms simultaneously and shift them into position at the load end of the oven.

Load elevator 172 is actuated to lower a pallet subassembly 166. As the pallet subassembly is lowered towards the open ended preforms, collets or coupling subassemblies 196 engage the preforms. Actuator 182 shifts pallet 166 off elevator 172 and onto track 162. The collets and hence the preforms supported thereon are continuously rotated by chains 410 as they pass through the oven. The pallets are transported through the oven in a stepwise fashion. As a pallet is loaded onto track 162, a pallet is moved into position on discharge elevator 174. Preform stripper mechanism 322 is actuated and the preform jaw sets of jaw assembly 452 are closed on the necks of the now heated preforms. Discharge elevator 174 is raised so that the pallet is positioned in line with return tracks 167. Actuator 182 shifts the pallet 166 onto the return track. The pallet pusher dogs or tabs are engaged by the dogs on the return conveyor 168. The pallet is moved continuously to the discharge end of the chain conveyor and the load end of the oven. The process of movement through the oven is then continued.

The preform transport or transfer mechanism shifts the heated preforms between the now open platens and mold halves of the blow station 30. The platen toggle assemblies are actuated to close the mold parts around the preform. If so equipped, the cam plates 620 raise the mold bottom and bottom platen into position. The blow head is lowered and the product is blow molded within the closed mold. The transfer mechanism is actuated to position the product jaws at the necks of the preforms within the mold. At the completion of the mold cycle, the platens are moved away from each other opening the mold. The blown product is now grasped by the jaw sets of the product jaw assembly. Upon actuation of the transfer mechanism to position a new set of heated preforms at the mold station, the finished product is removed from the mold station to the eject station.

The blow molding machine in accordance with the present invention is of substantially reduced complexity from that of previously available machines. The individual components including the loader, oven, oven transport, preform transfer mechanism and lower mold platen cam actuator may be retrofit to an existing blow molding machine individually or as a unit for a total rebuild. The components are readily adapted to blow mold different preform finishes ranging from 24 millimeters to 89 millimeters, for example. The apparatus is a universal machine capable of manufacturing a wide variety of products from soft drink beverage bottles to wide mouth food containers. Uniform and even heating of the preforms is achieved in the oven due to the preform rotation chains. Improved production at reduced cost is achieved.

In view of the foregoing description, those of ordinary skill in the art may envision various modifications which will not depart from the inventive concepts disclosed herein. The above description should be considered as that of the preferred embodiments. The true spirit and scope may be determined by reference to the appended claims.

We claim:

1. A reheat blow mold machine, comprising:

an oven for heating premanufactured preforms to a blow temperature, said oven including an elongated base;

a plurality of pallet assemblies slidably supported on said base in tandem, abutting relationships, said base having a discharge end and a loading end and each pallet assembly having means for holding a plurality of preforms;

a return conveyor;

a discharge elevator for transferring a pallet from the discharge end of said base to the return conveyor and a load elevator for transferring a pallet from the return conveyor to a load position at the load end of said base;

a preform loader means at said oven for receiving preforms and moving them to said load position for engagement by the pallets;

a blow mold station means adjacent a discharge end of said oven for blow molding heated preforms into articles; and preform transfer means for transferring preforms from said oven to said mold station and for ejecting said articles from said mold station means.

2. A reheat blow mold machine as defined by claim 1, wherein said oven further includes:
elongated track means slidably supporting said pallets; and
a pusher actuator on the base for pushing a pallet from said load elevator onto said track and thereby pushing another pallet off said track and onto said discharge elevator.

3. A reheat blow mold machine, as defined by claim 2 wherein each of said pallets comprises:
a shuttle having ends positioned within said track means, said shuttle defining a plurality of collet bores; and
a plurality of collet means, one within each of said collet bores, for engaging and holding said preforms.

4. A reheat blow mold machine as defined by claim 3 wherein each of said collet means comprises:
a spindle supported for rotational and vertical movement within said bore;
a sprocket secured to said spindle;
a resilient nose cup secured to said spindle opposite said sprocket for resiliently engaging an inner surface of said preform; and
a stripper cup on said shuttle concentric with said bore for engaging the preform and stripping the preform from said nose cup upon vertical movement of the spindle.

5. A reheat blow mold machine as defined by claim 4 wherein said discharge elevator includes preform stripping means for engaging each of the collets on a pallet and raising said spindles to strip the preforms from said nose cups.

6. A reheat blow mold machine as defined by claim 1 wherein said preform loader means comprises:
a loader base;
a plurality of support plates extending vertically from said base and defining a plurality of lanes;
a plurality of resiliently, mounted members at each lane for holding preforms at an entrance end of said loader;
a reciprocable loader jaw means on said loader base for engaging said preforms and moving them from an entrance end to said load position.

7. A reheat blow mold machine as defined by claim 6 wherein said reciprocable loader jaw means comprises:
a carriage slidably mounted on said loader base;
a plurality of jaw lever arms pivoted to said carriage;
a plurality of jaw members, each on one of said lever arms to define a loader jaw set at each of said lanes;
loader jaw actuators for opening and closing said loader jaw sets; and
a carriage actuator for reciprocating said carriage on said loader base.

8. A reheat blow mold machine as defined by claim 5 wherein said preform loader means comprises:
a loader base;
a plurality of support plates extending vertically from said loader base and defining a plurality of lanes;
a plurality of resiliently mounted members at each lane for holding preforms at an entrance end of said loader base;
a reciprocable loader jaw means on said loader base for engaging said preforms and moving them from an entrance end to said load position.

9. A reheat blow mold machine as defined by claim 8 wherein said reciprocable loader jaw means comprises:
a carriage slidably mounted on said loader base;
a plurality of jaw lever arms pivoted to said carriage;
a plurality of jaw members, each on one of said lever arms to define a loader jaw set at each of said lanes;
loader jaw actuators for opening and closing said loader jaw sets; and
a carriage actuator for reciprocating said carriage on said loader base.

10. A reheat blow mold machine as defined by claim 1 wherein said preform transfer means comprises:
an elongated transfer bar having a preform section and a product section;
bracket means on said blow mold station means engaging said transfer bar for slidably mounting said bar on the blow mold machine;
drive means connected to said transfer bar for reciprocating said bar;
a preform jaw assembly on said transfer bar at said preform section for grasping a plurality of preforms at the oven; and
a product jaw assembly on said transfer bar at said product section for grasping formed product at the blow mold station means, said preform jaw assembly and said product jaw assembly each including:
a plurality of jaw sets, each set including a left-hand jaw and a right-hand jaw, said jaws being pivoted to said transfer bar and each defining an actuator arm;
a left jaw slide bar operatively connected to each of said left jaws;
a right jaw slide bar operatively connected to each of said right jaws, each of said slide bars defining pocket means for receiving said actuator arm of said jaws; and
drive means on said transfer bar for shifting said slide bars in opposite directions to open and close said jaws.

11. A reheat blow mold machine as defined by claim 10 wherein said drive means comprises:
a pinion, each of said slide bars defines a rack portion in engagement with said pinion; and
a rack actuator engaging said pinion for alternately rotating said pinion.

12. A reheat blow mold machine as defined by claim 11 wherein said bracket means comprises:

an elongated rail fixed to said transfer bar; and
a plurality of mounting members, each defining a groove for receiving said rail.

13. A reheat blow mold machine as defined by claim 10 wherein each of said pocket means of said slide bars includes a preform size compensating means for allowing each jaw to accommodate preform diameter variations.

14. A reheat blow mold machine as defined by claim 13 wherein said size compensating means comprises:
a plunger disposed within, said pocket means and having an end abutting said jaw actuator arm;
a spring engaging said plunger and biasing the plunger against said jaw actuator arm; and
a guide pin engaging said plunger.

15. A reheat blow mold machine as defined by claim 14 wherein each of said jaws includes a curved preform engaging portion and said actuator arm having a semicircular shaped end disposed within said pocket means.

16. A reheat blow mold machine as defined by claim 9 wherein said preform transfer means comprises:
an elongated transfer bar having a preform section and a product section;
bracket means on said blow mold station means engaging said transfer bar for slidably mounting said bar on the blow mold machine;
drive means connected to said transfer bar for reciprocating said bar;
a preform jaw assembly on said transfer bar at said preform section for grasping a plurality of preforms at the oven; and
a product jaw assembly on said transfer bar at said product section for grasping formed product at the blow mold station means, said preform jaw assembly and said product jaw assembly each including:
a plurality of jaw sets, each set including a left-hand jaw and a right-hand jaw, said jaws being pivoted to said transfer bar and each defining an actuator arm;
a left jaw slide bar operatively connected to each of said left jaws;
a right jaw slide bar operatively connected to each of said right jaws, each of said slide bars defining pocket means for receiving said actuator arm of said jaws; and
drive means on said transfer bar for shifting said slide bars in opposite directions to open and close said jaws.

17. A reheat blow mold machine as defined by claim 16 wherein said drive means comprises:
a pinion, each of said slide bars defines a rack portion in engagement with said pinion; and
a rack actuator engaging said pinion for alternately rotating said pinion.

18. A reheat blow mold machine as defined by claim 17 wherein said bracket means comprises:
an elongated rail fixed to said transfer bar; and
a plurality of mounting members, each defining a groove for receiving said rail.

19. A reheat blow mold machine as defined by claim 18 wherein each of said pocket means of said slide bars includes a preform size compensating means for allowing each jaw to accommodate preform diameter variations.

20. A reheat blow mold machine as defined by claim 19 wherein said size compensating means comprises:
a plunger disposed within said pocket means and having an end abutting said jaw actuator arm;
a spring engaging said plunger and biasing the plunger against said jaw actuator arm; and
a guide pin engaging said plunger.

21. A reheat blow mold machine as defined by claim 1 wherein said blow mold station means comprises:
a pair of spaced right and left half platens;
a platen actuator means engaging at least one of said right and left half platens for moving said right and left half platens from an open position to a closed position;
a bottom platen support means for mounting said bottom platen for vertical movement between a bottom platen open position and a bottom platen closed position;
a cam plate mounted on one of said right and left half platens;
a cam follower on said bottom platen positioned to be engaged by said cam plate upon closing movement of said right and left half platens to raise said bottom platen to said bottom platen closed position.

22. A reheat blow mold machine as defined by claim 5 wherein said blow mold station means comprises:
a pair of spaced right and left half platens;
a platen actuator means engaging at least one of said right and left half platens for moving said right and left half platens from an open position to a closed position;
a bottom platen;
bottom platen support means for mounting said bottom platen for vertical movement between a bottom platen open position and a bottom platen closed position;
a cam plate mounted on one of said right and left half platens;
a cam follower on said bottom platen positioned to be engaged by said cam plate upon closing movement of said right and left half platens to raise said bottom platen to said bottom platen closed position.

23. A reheat blow mold machine as defined by claim 9 wherein said blow mold station means comprises:
a pair of spaced right and left half platens;
a platen actuator means engaging at least one of said right and left half platens for moving said platens from an open position to a closed position;
a bottom platen;
bottom platen support means for mounting said bottom platen for vertical movement between a bottom platen open position and a bottom platen closed position;
a cam plate mounted on one of said right and left half platens;
a cam follower on said bottom platen positioned to be engaged by said cam plate upon closing movement of said right and left half platens to raise said bottom platen to said bottom platen closed position.

24. A reheat blow mold machine as defined by claim 20 wherein said blow mold station means comprises:
a pair of spaced left and right half platens;
a platen actuator means engaging at least one of said right and left half platens for moving said right and left half platens from an open position to a closed position;
a bottom platen;
bottom platen support means for mounting said bottom platen for vertical movement between a bottom platen open position and a bottom platen closed position;
a cam plate mounted on one of said right and left half platens;
a cam follower on said bottom platen positioned to be engaged by said cam plate upon closing movement of said right and left half platens to raise said bottom platen to said bottom platen closed position.

* * * * *